United States Patent
Shin

(10) Patent No.: US 12,417,338 B2
(45) Date of Patent: Sep. 16, 2025

(54) MODIFYING THE PRESENTATION OF DRAWING OBJECTS BASED ON ASSOCIATED CONTENT OBJECTS IN AN ELECTRONIC DOCUMENT

(71) Applicant: Google LLC, Mountain View, CA (US)

(72) Inventor: Dongeek Shin, San Jose, CA (US)

(73) Assignee: Google LLC, Mountain View, CA (US)

( * ) Notice: Subject to any disclaimer, the term of this patent is extended or adjusted under 35 U.S.C. 154(b) by 577 days.

(21) Appl. No.: 17/570,818

(22) Filed: Jan. 7, 2022

(65) Prior Publication Data

US 2023/0222281 A1     Jul. 13, 2023

(51) Int. Cl.
| | |
|---|---|
| G06F 3/045 | (2006.01) |
| G06F 3/0482 | (2013.01) |
| G06F 40/106 | (2020.01) |
| G06N 20/20 | (2019.01) |
| G06T 11/60 | (2006.01) |

(52) U.S. Cl.
CPC .......... G06F 40/106 (2020.01); G06F 3/0482 (2013.01); G06N 20/20 (2019.01); G06T 11/60 (2013.01); *G06F 2203/04803* (2013.01)

(58) Field of Classification Search
CPC ........ G06F 40/106; G06N 20/20; G06T 11/60
See application file for complete search history.

(56) References Cited

U.S. PATENT DOCUMENTS

| | | | | |
|---|---|---|---|---|
| 6,972,763 | B1* | 12/2005 | Millett | G06F 9/451 345/440 |
| 9,182,905 | B2* | 11/2015 | Lee | G06F 3/04842 |
| 10,769,827 | B1* | 9/2020 | Amerige | G06V 10/56 |
| 10,877,642 | B2* | 12/2020 | Bae | G06F 3/04883 |
| 10,970,476 | B2* | 4/2021 | Mikutel | G06F 40/279 |
| 11,074,397 | B1 | 7/2021 | Lu et al. | |
| 11,200,715 | B1* | 12/2021 | Takuma | G06F 40/30 |
| 11,402,991 | B2* | 8/2022 | Rucine | G06F 3/017 |
| 11,605,187 | B1* | 3/2023 | Hasanain | G06F 40/169 |
| 2008/0031488 | A1* | 2/2008 | Sato | G06F 9/451 382/100 |
| 2013/0246436 | A1* | 9/2013 | Levine | G06F 40/279 707/741 |

(Continued)

OTHER PUBLICATIONS

Lu et al., Text Segmentation in Unconstrained Hand-drawings in Whiteboard Photos, 2012, IEEE, 6 pages. (Year: 2012).*

(Continued)

*Primary Examiner* — Linh K Pham
(74) *Attorney, Agent, or Firm* — Lowenstein Sandler LLP

(57) ABSTRACT

An electronic document is provided for presentation via a graphical user interface (GUI). A first region of the electronic document includes content objects. A second region of the electronic document includes a drawing object. A determination is made, based on first characteristics associated with the content objects and second characteristics associated with the drawing object, that the drawing object corresponds to the content objects. A mapping is generated between the content objects and the drawing object. A modification to the content objects in the first region of the electronic document is identified. In response to the modification to the content objects, a presentation of the drawing object in the second region of the electronic document is modified in view of the generated mapping.

20 Claims, 10 Drawing Sheets

(56) References Cited

U.S. PATENT DOCUMENTS

| | | | |
|---|---|---|---|
| 2017/0091224 A1* | 3/2017 | Shioya | G06V 20/70 |
| 2019/0102646 A1* | 4/2019 | Redmon | G06V 20/20 |
| 2019/0205363 A1* | 7/2019 | Zukerman | G06V 30/416 |
| 2019/0220507 A1 | 7/2019 | Foss et al. | |
| 2020/0143575 A1* | 5/2020 | Kang | G06T 11/60 |
| 2020/0302021 A1 | 9/2020 | Poling et al. | |
| 2020/0326841 A1* | 10/2020 | Griffin | G06T 11/60 |
| 2021/0073324 A1* | 3/2021 | Gupta | G06F 40/169 |
| 2022/0172413 A1* | 6/2022 | Lee | G06T 11/001 |
| 2022/0237368 A1* | 7/2022 | Tran | G06N 20/00 |
| 2023/0334845 A1* | 10/2023 | Zuniga | G06V 30/422 |

OTHER PUBLICATIONS

Doreswamy et al., Improvement of Power and Time by gesture based Text Selection in Mobile Web Browser, 2015, IEEE, 6 pages (Year: 2015).*

"Switch between drawing and text mode in Microsoft OneNote Account & billing", Microsoft, https://support.microsoft.com/en-us/office/switch-between-drawing-and-text-mode-in-microsoft onenote-6448e88-19f5-4eee-8095-10355a4d7d0b, Originally downloaded Oct. 8, 2021, 3 pages.

"Write notes and draw in OneNote for Windows 10", Microsoft, https://support.microsoft.com/en-us/office/write-notes-and-draw-in-onenote-for-windows-10-82d1189d-eb6d-4b07-9101-b50e13645c28, Originally downloaded Oct. 8, 2021, 5 pages.

Rob Woodgate, "How to Position Images and Other Objects in Microsoft Word", https://www.howtogeek.com/363208/how-to-position-images-in-a-word-document/#:~:text=In your document%2C select the,and works the same way, Aug. 23, 2018, 13 pages.

PCT International Search Report and Written Opinion for International Application No. PCT/US2023/010344 mailed Apr. 17, 2023, 15 pages.

Li Bowen et al., "ManiGAN: Text-Guided Image Manipulation", 2020 IEEE/CVF Conference on Computer Vision and Pattern Recognition (CVPR), IEEE, Jun. 13, 2020 (Jun. 13, 2020), pp. 7877-7886, XP033804592, DOI: 10.1109/CVPR42600.2020.00790 [retrieved on Aug. 3, 2020] abstract.

Hai Wang et al., "Learning to Globally Edit Images with Textual Description", arxiv.org, Cornell University Library, 201 Olin Library Cornell University Ithaca, NY 14853, Oct. 13, 2018 (Oct. 13, 2018), XP081065300, abstract Form.

* cited by examiner

MODIFYING THE PRESENTATION OF DRAWING OBJECTS BASED ON ASSOCIATED CONTENT OBJECTS IN AN ELECTRONIC DOCUMENT

TECHNICAL FIELD

Aspects and implementations of the present disclosure relate to modifying the presentation of drawing objects based on associated content objects in an electronic document.

BACKGROUND

A platform (e.g., a collaborative document platform, etc.) can enable users to access electronic documents via a graphical user interface (GUI) associated with the platform. An electronic document can include one or more types of content objects, such as text objects (e.g., string of text), image objects (e.g., photos, etc.), and so forth. In some instances, a user can insert a drawing object (e.g., an annotation, a sketch) proximate to (e.g., on top of, next to, etc.) a content object. For example, the user can interact with a drawing tool provided via the platform GUI to draw an underline, a circle, a figure etc. relative to one or more content objects included in the electronic document to emphasize or otherwise annotate portions of the electronic document.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In some implementations, a system and method are disclosed for modifying the presentation of drawing objects based on associated content objects in an electronic document. In an implementation, a method includes providing an electronic document for presentation via a graphical user interface (GUI). A first region of the electronic document includes a set of content objects including at least one of a text object or an image object. A second region of the electronic document includes a drawing object. The method further includes determining, based on first object characteristics associated with the set of content objects and second object characteristics associated with the drawing object, whether the drawing object corresponds to the set of content objects. The method further includes, responsive to determining that the drawing object corresponds to the set of content objects, generating a mapping between the set of content objects and the drawing object. The method further includes identifying a modification to the set of content objects in the first region of the electronic document. The method further includes, responsive to the modification to the set of content objects in the first region, modifying a presentation of the drawing object in the second region of the electronic document in view of the mapping between the set of content objects and the drawing object.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
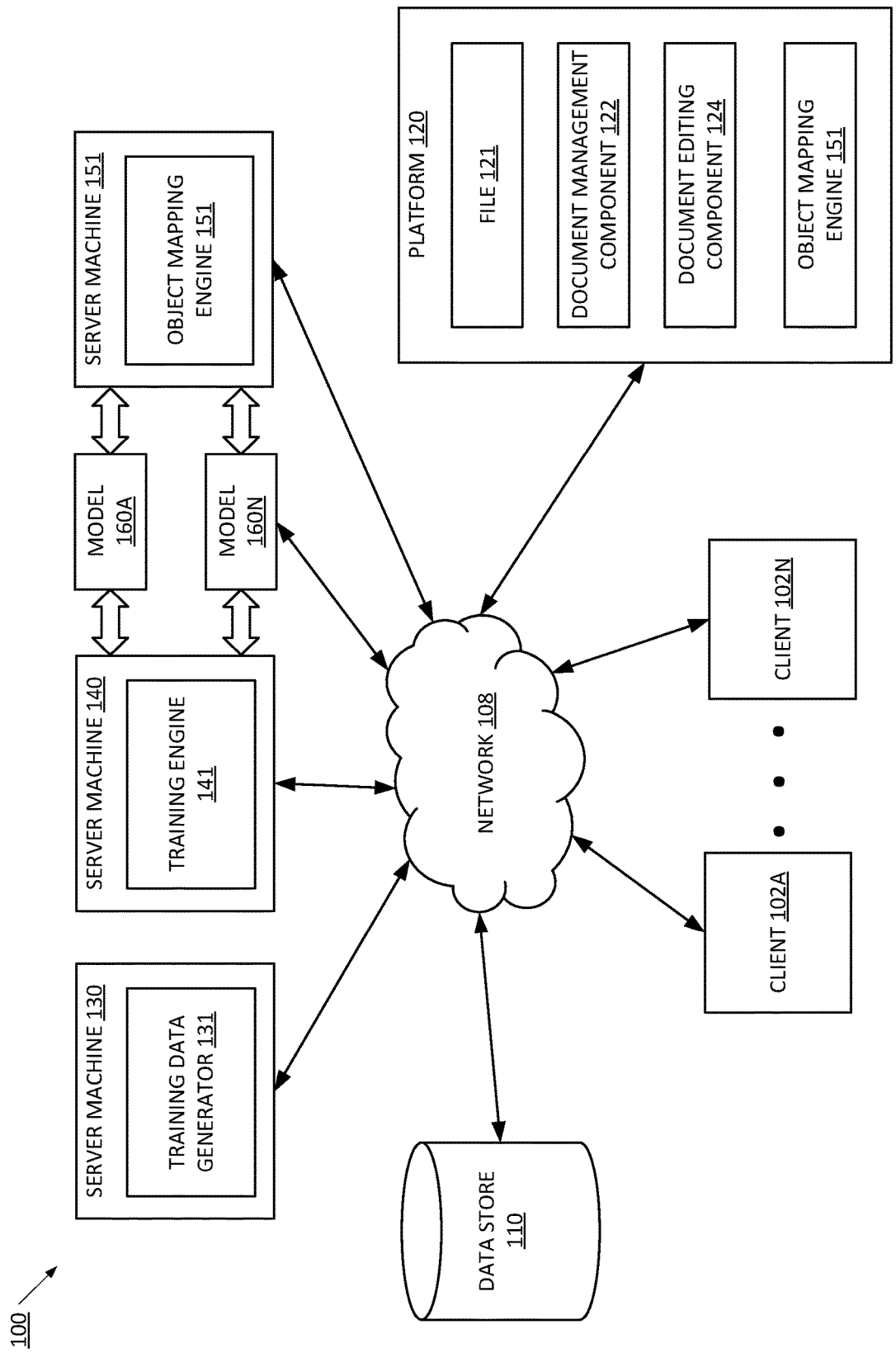
FIG. 1 illustrates an example system architecture, in accordance with implementations of the present disclosure.

Aspects of the present disclosure relate to modifying the presentation of drawing objects based on associated content objects in an electronic document. A platform, such as an electronic document platform, can provide a user with access to an electronic document via a graphical user interface (GUI) associated with the platform. The platform GUI can enable the user to consume the document, edit the document, annotate the document, and so forth. In some instances, the electronic document can include one or more types of content objects. A content object of the electronic document can include content that is provided by, or can be modified by, the user when accessing the electronic document. For example, the electronic document can include one or more text objects. Each text object can include a string of text that is provided by the user and/or can be modified (e.g., edited, added to, removed, etc.) by the user. In another example, the electronic document can include one or more image objects. Each image object can include an image or a photograph that is included (e.g., copied and pasted, imported, etc.) into the electronic document by the user.

In another example, the platform can provide one or more drawing tools via the platform GUI that enable the user to provide one or more drawing objects in the electronic document. A drawing object refers to drawing (e.g., an annotation, a sketch, etc.) that is provided by the user and/or can be modified by the user and corresponds to one or more content objects of the electronic document. A user can provide a drawing object to emphasize or otherwise highlight one or more content objects of the electronic document. For example, a user can use a drawing tool provided by the platform to draw an underline object to underline one or more text objects included in the electronic document. In another example, the user can use the drawing tool to draw a circle object or an arrow object proximate to one or more text objects included in the electronic document to emphasize such text objects. The user can additionally or alternatively provide a drawing object to illustrate one or more text objects of the electronic document. For example, one or more text objects of the electronic document can include text strings associated with the topic of apples. The user can use the drawing tool to provide a sketch of an apple to illustrate the topic.

The platform can provide the platform GUI according to different editing modes in order to enable the user to provide and/or edit text objects and drawing objects within the electronic document. For example, the platform can provide the platform GUI according to a content editing mode to enable the user to provide and/or edit text objects within the electronic document. When the platform GUI is provided according to the content editing mode, the user can add, remove, and/or edit content objects included within the electronic document. The user may not provide and/or modify drawing objects when the platform GUI is provided according to the content editing mode. The user can request, via a GUI element of the platform GUI, to switch from the content editing mode to a drawing editing mode. When the platform GUI is provided according to the drawing editing mode, the user can add, remove, and/or edit drawing objects relative to content objects within the electronic document. When the user is finished adding, removing and/or editing drawing objects, the user can request to switch from the drawing editing mode to the content editing mode by engaging with the GUI element (or another GUI element) of the platform GUI.

Conventional platforms do not associate drawing objects that are provided when the platform GUI is provided in the drawing editing mode with content objects that are provided when the platform GUI is provided in the content editing mode. For example, conventional platforms enable a user to draw an underline or a circle proximate to text objects when the platform GUI is provided in drawing editing mode. However, conventional platforms do not recognize any association between the underline or circle and the text objects. Accordingly, if the user switches the platform GUI from the drawing editing mode to the content editing mode and modifies content objects that are proximate to (e.g., close or closest to) the underline or circle and/or other content objects in the electronic document, the proximate content objects may be updated to accommodate the modification (e.g., if new text is added to the document, the text objects may shift to another line of the text document, etc.). However, the underline or circle that were drawn proximate to the content objects are not updated to accommodate the modification (e.g., the underline or circle is not shifted with text objects as new text is added to the document). As the drawing objects are not updated to accommodate the modification to the content objects, the user has to switch back to the drawing editing mode and manually update the drawing objects to correspond to the modified text objects.

In another example, an electronic document can include a first set of text objects that include text strings describing apples and a second set of text objects that include text strings describing oranges. A user of a conventional system can use the drawing tools to provide a sketch of the apple, however, as there is no association between the drawing object and the text objects, the conventional system may not present the sketch of the apple proximate to the text objects associated with the description of apples. Accordingly, the user has to switch between the content editing mode and the drawing editing mode to create a sufficient amount of space between the first set of text objects and the second set of text objects to accommodate the apple sketch and to place the apple sketch in the created space between the sets of text objects.

As several updates or modifications can be made to content objects of an electronic document (e.g., by multiple different users of the platform) and/or several drawing objects can be provided proximate to the content objects, the number of times that the user switches between the content editing mode and the drawing editing mode to update the drawing objects can be large. Switching between the content editing mode and drawing editing mode and updating drawing objects to correspond to modified content objects can consume a significant amount of computing resources, which are therefore unavailable for other processes of the computing system associated with the user (e.g., a client device) and/or the platform. Accordingly, an overall system efficiency is decreased and an overall system latency is increased.

Aspects of the present disclosure address the above and other deficiencies by providing techniques for modifying the presentation of drawing objects based on associated content objects in an electronic document. A platform can provide an electronic document via a platform GUI at a client device. A user associated with the client device can access (e.g., consume, modify, provide to, etc.) the electronic document via the platform GUI. For example, the user can provide and/or modify content objects (e.g., text objects, image objects, etc.) of the electronic document when the platform provides the platform GUI according to a content editing mode. The user can provide and/or modify drawing objects of the electronic document when the platform provides the platform GUI according to a drawing editing mode.

In some embodiments, the platform can detect that the user has provided one or more drawing objects proximate to a set of content objects of the electronic document. In response to detecting that the user has provided the one or more drawing objects, the platform can determine whether characteristics associated with the drawing object(s) correspond to characteristics associated with the set of content objects. For example, a set of text objects can be included in a region of the electronic document associated with first coordinates and the drawing object(s) can be included in a region of the electronic document associated with second coordinates. The platform can determine whether a proximity of the first coordinates to the second coordinates satisfies a proximity criterion (e.g., meets and/or exceeds a proximity threshold) and, if so, determine that the set of text objects is associated with the drawing object(s). In another example, the platform can determine a topic associated with the set of text objects and a topic associated with the drawing object(s) (e.g., using one or more machine learning models). In response to determining that the topic associated with the set of text objects corresponds to the topic associated with the drawing object(s), the platform can determine that the set of text objects is associated with the drawing object(s).

Responsive to determining that the set of content objects is associated with the drawing object(s), the platform can generate a mapping between the set of content objects and the drawing object(s). The generated mapping between the set of content objects and the drawing object(s) can indicate the association between the set of content objects and the drawing object(s). In some embodiments, the user can edit (e.g., while the platform GUI is provided in the content editing mode) one or more content objects of the electronic document (e.g., of the set of content objects or other content objects of the electronic document). In response to detecting that the user has edited the one or more content objects, the platform can modify the presentation of the drawing object (s) in the second region of the electronic document in accordance with the modification to the content objects. In one illustrative example, the user can add one or more additional text objects to a set of text objects associated with an underline drawing object. In such example, the platform can increase a size of the underline drawing object to underline the additional text objects added to the set of text objects. In another illustrative example, the user can remove one or more text objects from the set of text objects associated with a circle drawing object. The platform can decrease the size of the circle drawing object to include the text objects that remain in the set of text objects. In yet another illustrative example, the user can remove the set of text objects from the electronic document. The platform can remove the drawing object(s) associated with the removed set of text objects. The platform can modify the presentation of the drawing object(s) in the second region of the electronic document in view of the mapping between the drawing object(s) and the set of text objects. Further details regarding such examples are provided with respect to FIGS. 4A-5D.

In some embodiments, the platform can present the drawing object(s) in a particular region of the electronic document based on the generated mapping between the drawing object(s) and the set of content objects. For example, as described above, the platform can determine that a set of text objects correspond to the topic of apples and the drawing object(s) depict an apple. Accordingly, the platform can update the electronic document to move other text objects (e.g., that do not correspond to the topic of apples) away from the set of text objects to create a space in the electronic document that is sufficient to accommodate the drawing object(s) in a region that is proximate to the set of text objects. The platform can provide the drawing object(s) in the created space so that the drawing object(s) are provided proximate to the set of text objects. Further details regarding such example are provided with respect to FIGS. 6A-6C.

Aspects of the present disclosure include techniques to automatically provide drawing object(s) proximate to associated content object(s) within an electronic document. Embodiments of the present disclosure provide techniques to enable a platform, such as a collaborative document platform, to associate drawing object(s) that are provided when a platform GUI is in a drawing editing mode with content objects (e.g., text objects, image objects, etc.) that are provided when the platform GUI is in a content editing mode. Accordingly, the platform can automatically modify the presentation of a drawing object(s) when associated content object(s) (or other content objects) are modified in the electronic document. Additionally or alternatively, the platform can automatically cause drawing object(s) to be presented in a region of an electronic document that is proximate to associated content object(s) that share a common topic with the drawing object(s), based on the determined association.

By automatically presenting the drawing object(s) proximate to associated content object(s) and/or modifying the drawing object(s) according to modifications of the associated text object(s), a user does not have to manually move the drawing object(s) and/or content object(s) to provide the drawing object(s) in regions proximate to (e.g., close to or closest to) the content object(s). The number of instances that the platform switches the platform GUI between the content editing mode and the drawing editing mode and the amount of editing and/or modifications to the electronic document provided by the user is decreased. Accordingly, fewer computing system resources (e.g., of a client device associated with the user, of the platform) are consumed, which increases the amount of computing resources available for other processes of the computing system. Therefore, an overall system efficiency is increased and an overall system latency is decreased.

FIG. 1 illustrates an example system architecture 100, in accordance with implementations of the present disclosure. The system architecture 100 (also referred to as "system" herein) includes client devices 102A-N, a data store 110, a platform 120, and/or server machines 130-150 each connected to a network 108. In implementations, network 108 can include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 110 is a persistent storage that is capable of storing data as well as data structures to tag, organize, and index the data. A data item can include audio data and/or image data, in accordance with embodiments described herein. In other or similar embodiments, a data item can correspond to a document displayed via a graphical user interface (GUI) on a client device 102, in accordance with embodiments described herein. Data store 110 can be hosted by one or more storage devices, such as main memory, magnetic or optical storage based disks, tapes or hard drives, NAS, SAN, and so forth. In some implementations, data store 110 can be a network-attached file server, while in other embodiments data store 110 can be some other type of persistent storage such as an object-oriented database, a relational database, and so forth, that may be hosted by platform 120 or one or more different machines coupled to the platform 120 via network 108.

The client devices 102A-N can each include computing devices such as personal computers (PCs), laptops, mobile phones, smart phones, tablet computers, netbook computers, network-connected televisions, etc. In some implementations, client devices 102A-N may also be referred to as "user devices." Each client device can include a content viewer. In some embodiments, a content viewer can be an application that provides a graphical user interface (GUI) for users to view, create, or edit content of a file 121, such as an electronic document file, an electronic message file (e.g., an email file), an image file, a video file, etc. For example, the content viewer can be a web browser that can access, retrieve, present, and/or navigate files 121 served by a web server. The content viewer can render, display, and/or present the content of a file 121 to a user. In one example, the content viewer can be a standalone application (e.g., a mobile application or app) that allows users to view, edit, and/or create digital content items (e.g., electronic documents, electronic messages, digital video items, digital images, electronic books, etc.). In some implementations, the content viewer can be an electronic document platform application for users to generate, edit, and/or upload content for electronic documents on the platform 120. In other or similar implementations, the content viewer can be an electronic messaging platform application (e.g., an electronic mail (e-mail) application) for users to generate and send messages via platform 120. As such, the content viewers can be provided to the client devices 102A-102N by platform 120.

In some implementations, platform 120 and/or server machines 130-150 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to a file 121 (e.g., an electronic document, an e-mail message, etc.) and/or provide the file 121 to the user. For example, platform 120 can be an electronic document platform. The electronic document platform may allow a user to create, edit (e.g., collaboratively with other users), access or share with other users an electronic document stored at data store 110. In another example, platform 120 can be an electronic messaging platform (e.g., e-mail platform). The electronic messaging platform can allow a user to create, edit, or access electronic messages (e.g., e-mails) addressed to other users of the electronic messaging platform or users of client devices outside of the electronic messaging platform. Platform 120 can also include a website (e.g., a webpage) or application back-end software that can be used to provide a user with access to files 121.

As illustrated in FIG. 1, platform 120 can include a document management component 122, in some embodiments. Document management component 122 can be configured to manage access to a particular document by a user of platform 120. For example, a client device 102 can provide a request to platform 120 for a particular file 121 corresponding to an electronic document. Document management component 122 can identify the file 121 (e.g., stored in data store 110) and can determine whether a user associated with the client device 102 is authorized to access the requested file 121. Responsive to determining that the user is authorized to access the requested file 121, document management component 122 can provide access to the file 121 to the client device 102. The client device 102 can provide the user with access to the file via the GUI of the content viewer, as described above.

As indicated above, a user can create and/or edit an electronic document (e.g., of file 121) via a GUI of a content viewer of a client device associated with the user (also referred to herein as a platform GUI). In some embodiments, the electronic document can be or can correspond to a word document, slide presentation document, a spreadsheet document, and so forth. Platform 120 can include a document editing component 124, which is configured to enable a user to create and/or edit an electronic document. For example, a client device 102 associated with a user of platform 120 can transmit a request to platform 120 to create a word document based on a word document template associated with platform 120. Platform 120 can generate a file 121 associated with the word document based on the word document template and can provide the user with access to the word document via the platform GUI. In another example, a client device 102 associated with a user of platform 120 can transmit a request to access an electronic document (e.g., a word document) via the platform GUI. Document management component 122 can obtain the file 121 associated with the requested electronic document, as described above, and document editing component 124 can provide the user with access to the electronic document via the platform GUI. The user can edit one or more portions of the electronic document via the platform GUI and the document editing component 124 can update the file 121 associated with the electronic document to include the edits to the one or more portions.

An electronic document can include multiple different types of content objects. For example, an electronic document can include text objects (e.g., text strings), image objects (e.g., images), and so forth. An electronic document can also include drawing objects (e.g., annotations, sketches, etc.) that are provided by the user to emphasize or otherwise highlight one or more content objects of the electronic document. Document editing component 124 can enable the user to provide and/or modify objects of the electronic document, in accordance with embodiments described above. In some embodiments, document editing component 124 can provide the platform GUI according to a particular mode associated with the type of object that the user wishes to provide and/or modify. For example, document editing component 124 can provide the platform GUI to client device 102 according to a content editing mode. When the platform GUI is provided according to the content editing mode, the user associated with client device 102 can provide and/or edit content objects included in the electronic document without editing drawing objects included in the electronic document. The platform GUI can include one or more GUI elements that enable the user to request that the platform GUI be provided according to a drawing editing mode. When the platform GUI is provided according to the drawing editing mode, the user can provide and/or edit drawing objects included in the electronic documents without editing text objects included in the electronic document. Accordingly, the user can provide drawing objects proximate to (e.g., over top of, next to, etc.) text objects that the user wishes to annotate or otherwise emphasize in the electronic document.

As illustrated in FIG. 1, platform 120 can include an object mapping engine 151 that is configured to generate mappings between content objects that are provided and/or edited when the platform GUI is provided according to the content editing mode and drawing objects that are provided and/or edited when the platform GUI is provided according to the drawing editing mode. A user associated with client device 102 can provide and/or edit drawing object(s) when the platform GUI is provided in the drawing editing mode, as described above. In some embodiments, the drawing object(s) can be provided proximate to content object(s) of the electronic document. For example, the drawing object(s) can include an underline drawing object that is provided underneath one or more text objects. In another example, the drawing object(s) can include a circle object and/or an arrow object that is provided on top of or next to one or more text objects. In yet another example, the drawing object(s) can include a sketch or a drawing that is provided on top of or next to one or more text objects. Object mapping engine 151 can detect that the user is finished providing and/or editing the drawing object(s) (e.g., by detecting that the user has requested to switch the platform GUI from the drawing editing mode to the content editing mode, etc.). In response to detecting that the user is finished providing and/or editing the drawing object(s), object mapping engine 151 can determine whether the drawing object(s) correspond to content object(s) based on characteristics of the text object(s) and/or the drawing object(s). The characteristics of the content object(s) and/or the drawing object(s) can include coordinates associated with regions of the electronic document that include the text object(s) and/or the drawing object(s). For example, text objects can be included in a region of the electronic document that is associated with first coordinates and drawing objects can be included in a region of the electronic document that is associated with second coordinates. Object mapping engine 151 can determine that the first coordinates and the second coordinates satisfy a proximity criterion (e.g., the proximity between the first coordinates and the second coordinates meet and/or exceed a proximity threshold), and therefore the drawing objects are associated with the text objects. In other or similar embodiments, the characteristics of the content object(s) and/or the drawing object(s) can include a topic associated with the text object(s) and/or drawing object(s). Object mapping engine 151 can determine the topics associated with text object(s) and/or drawing object(s) using one or more machine learning models 160 that are trained to predict topics associated with objects of an electronic document. Further details regarding training and using machine learning models 160 are provided herein.

Server machine 130 can include a training set generator 131 that is capable of generating training data (e.g., a set of training inputs and a set of target outputs) to train ML models 160A-N. In some embodiments, training data can be associated with training a model 160 to predict a topic associated with a content object of an electronic document. For example, training data can be generated based on text strings (e.g., words, phrases, sentences, paragraphs, etc.) that have been previously provided in an electronic document associated with platform 120 (or another platform). In one illustrative example, training set generator 131 can obtain one or more text strings from electronic documents associated with platform 120. Training set generator 131 can also determine a topic associated with each of the one or more text strings and can generate a mapping between a respective text string and a determined topic. In one example, training set generator 131 (or another component of system 100) can determine the topic of the one or more text strings by providing a message to a user via a GUI of a client device 102 inquiring the topic of the one or more text strings of the electronic document. The user can engage with a GUI element of the GUI to provide an indication of the topic of the one or more text strings. In other or similar embodiments, training set generator 131 (or another component of system 100) can determine a topic of the one or more text strings based on other text string of the electronic document. For example, training set generator 131 can analyze text strings of an electronic document and can determine that one or more text strings are provided in a region of the electronic document that are associated with a particular header or headline. Training set generator 131 can determine that the topic of the one or more text strings corresponds to the content of the particular header or headline.

In other or similar embodiments, training set generator 131 can obtain one or more text strings from one or more text string sources that are associated with a particular topic. For example, training set generator 131 can access an electronic copy of a history text book (e.g., via network 108 or another network) and obtain one or more text strings from the history text book. Training set generator 131 can determine that each text string is associated with the topic of "history" based on the topic of the text book of which the text strings are obtained, and can generate a mapping between the associated topic and each text string. In a further example, the history text book can include multiple chapters that cover distinct eras of history (e.g., the Revolutionary War, the Civil War, etc.). Training set generator 131 can further determine the topic of the text string based on the topic of the chapter of which the text string was obtained and can generate an additional or alternative mapping between the chapter topic and the text string, as described above. It should be noted that the above provides only illustrative examples of how training set generator 131 can obtain a topic associated with a text string. Training set generator 131 may implement other techniques to obtain the topic associated with a respective text string. Training set generator 131 (or another component of system 100) can store the mapping between a respective text string and a determined topic at data store 110.

Training set generator 131 can also generate training data associated with training a model 160 to predict a topic associated with a drawing object of an electronic document. In some embodiments, training set generator 131 can obtain drawing objects provided by users of platform 120 to electronic documents, as described above. Training set generator 131 (or another component of system 100) can provide a notification to the users (e.g., via the platform GUI) that includes a request that the users indicate a topic or type of drawing object that was provided (e.g., an underline, a circle, an arrow, a type of sketch, etc.) Training set generator 131 (or another component of system 100) can generate a mapping between the drawing object and the indicated topic or type provided by the users and store the generated mapping at data store 110. In other or similar embodiments, training set generator 131 can analyze a drawing object according to a set of drawing object rules to determine a type associated with the drawing object. For example, the drawing object can be an underline drawing object, which can include a straight, or approximately straight, line. Training set generator 131 can determine that the underline drawing object is an underline-type object based on a set of drawing rules (e.g., provided by a user or developer of platform 120) and can generate a mapping between the drawing object and the determined object type, as described above. In some embodiments, the set of drawing object rules can provide that a topic associated with an underline-type object (e.g., and/or a circle type object, an arrow type object, etc.) corresponds to an annotation. Accordingly, training set generator can additionally or alternatively generate a mapping between the drawing object and the annotation topic, as described above.

Training set generator 131 can generate a set of training data by identifying data corresponding to previously provided text strings and/or drawing objects stored at data store 110. Each set of training data can include a subset of training inputs and target outputs based on the identified data. In some embodiments, training set generator 131 can generate training data for training the text topic model 160 by obtaining text topics for each previously provided text string included at data store 110. Training set generator 131 can include a respective previously provided text string in the subset of training inputs and the obtained text topic in the subset of target outputs. In some embodiments, training set generator 131 can include additional data associated with the text string in the subset of target outputs. For example, training set generator 131 can determine a grammatical structure associated with the text string (e.g., in view of one or more grammatical structure rules, using a grammatical structure machine learning model, etc.) and include an indication of the determined grammatical structure in the subset of target outputs. Additionally or alternatively, training set generator 131 can generate an additional set of training data to train a machine learning model 160 to predict a grammatical structure associated with given input text objects. The additional set of training data can include a subset of training inputs including previously provided text objects, as described above, and a subset of target outputs including a grammatical structure associated with a respective previously provided text object. In one example, training set generator 131 can obtain the grammatical structure of the previously provided text objects from an accepted linguistic authority (e.g., a professional linguist), or other type of grammatical authority.

In other or similar embodiments, training set generator 131 can generate training data for training the drawing topic model 160 by obtaining drawing types and/or topics for each previously provided drawing object included at data store 110. Training set generator 131 can include a respective previously provided drawing object in the subset of training inputs and the obtained drawing topic and/or type in the subset of target outputs. In some embodiments, training set generator 131 can generate separate sets of training data to train model 160 to predict drawing topics and drawing types. For example, training set generator 131 can generate first training data including a first subset of training inputs and a first subset of target outputs. The first subset of training inputs can include a previously provided drawing object (e.g., included in data store 110, as described above) and the first subset of target outputs can include a drawing topic associated with the drawing object. The first set of training data can be used (e.g., by training engine 141) to train a first model 160A to predict drawing topics for given drawing objects. Training set generator 131 can additionally or alternatively generate second training data including a second subset of training inputs and a second subset of target outputs. The second subset of training inputs can include a previously provided drawing object and the second subset of target outputs can include a drawing type associated with the drawing object. The second set of training data can be used (e.g., by training engine 141 to train a second model 160B to predict drawing types for given drawing objects.

Server machine 140 can include a training engine 141. Training engine 141 can train a machine learning model 160A-N using the training data from training set generator 131. The machine learning model 160A-N can refer to the model artifact that is created by the training engine 141 using the training data that includes training inputs and corresponding target outputs (correct answers for respective training inputs). The training engine 141 can find patterns in the training data that map the training input to the target output (the answer to be predicted), and provide the machine learning model 160A-N that captures these patterns. The machine learning model 160A-N can be composed of, e.g., a single level of linear or non-linear operations (e.g., a support vector machine (SVM or may be a deep network, i.e., a machine learning model that is composed of multiple levels of non-linear operations). An example of a deep network is a neural network with one or more hidden layers, and such a machine learning model may be trained by, for example, adjusting weights of a neural network in accordance with a backpropagation learning algorithm or the like. For convenience, the remainder of this disclosure will refer to the implementation as a neural network, even though some implementations might employ an SVM or other type of learning machine instead of, or in addition to, a neural network. In one aspect, the training set is obtained by training set generator 131 hosted by server machine 130. In some embodiments, the machine learning model 160 can be a text topic model, a text structure model, a drawing type model, and/or a drawing topic model, described with respect to FIG. 3.

It should be noted that although embodiments of the present disclosure describe distinct machine learning models being trained to predict data associated with different types of content objects, training engine 141 can train a single machine learning model 160 to predict data associated with each type of content object. For example, training engine 141 can use each set of training data generated by training set generator 131 to train a single machine learning model 160 to predict a topic and/or type associated with a given text object and/or drawing object. In some embodiments, the subset of target outputs in the training data set can include an indication of whether a corresponding object in the subset of training inputs is a text object, a drawing object, etc.

Server machine 150 includes an object mapping engine 151 that provides text object(s) and/or drawing object(s) as input to one or more machine learning models 160 to obtain one or more outputs. In some embodiments, object mapping engine 151 can provide a content object (e.g., a text object) as input to a first machine learning model 160A that is trained to predict a topic associated with the provided content object, as described above. Object mapping engine 151 can determine the topic associated with the provided content object based on one or more outputs of the first machine learning model 160A, in accordance with embodiments described with respect to FIG. 3. In other or similar embodiments, object mapping engine 151 can provide a drawing object as input to a second machine learning model 160B that is trained to predict a topic and/or type associated with the provided drawing object, as described above. Object mapping engine 151 can determine the topic associated with the provided content object based on one or more outputs of the second machine learning model 160B, in accordance with embodiments described with respect to FIG. 3.

As described above, object mapping engine 151 can determine whether drawing object(s) provided in an electronic document are associated with content object(s) in the electronic document based on characteristics of the drawing object(s) and the content object(s). The characteristics can include a topic associated with the content object(s) and a topic and/or type associated with the drawing object(s). Object mapping engine 151 can determine the topic associated with the content object(s) based on one or more outputs of a machine learning model (e.g., machine learning model 160A), as described above. Object mapping engine 151 can determine the topic and/or type associated with the drawing object(s) based on one or more outputs of a machine learning model (e.g., machine learning model 160B), as described above. Object mapping engine 151 can determine whether the topic associated with the content object(s) corresponds to the topic and/or type associated with the drawing object(s) and, if so, object mapping engine 151 can determine that the drawing object(s) are associated with the content object(s). In an illustrative example, object mapping engine 151 can determine, based on outputs of machine learning model 160A, that text object(s) are associated with a topic of "apples" and, based on the output of machine learning model 160B, that drawing object(s) have the type of a "sketch" and are associated with the topic of "apples." As the topic of the text object is the same as the topic of the drawing object, object mapping engine 151 can determine that the drawing object(s) are associated with the text object(s).

In response to determining that a drawing object is associated with a content object, object mapping engine 151 can generate a mapping between the drawing object and the content object. In some embodiments, object mapping engine 151 can store the generated mapping in data store 110, a memory associated with client device 102, and/or another memory associated with system 100. In some embodiments, object mapping engine 151 (or another component of platform 120) can modify the set of content objects included in the electronic document. For example, object mapping engine 151 can detect that the user associated with client device 102 has requested to switch the platform GUI from the drawing editing mode to the content editing mode. In one example, the drawing object can be an annotation object (e.g., an underline, a circle, an arrow, etc.). Object mapping engine 151 can detect a modification to the associated text object(s) in the electronic document (e.g., other text object(s) are added or removed from the electronic document, etc.). The modification to the associated text object(s) can cause at least a portion of the associated text object(s) to be moved to another region of the electronic document, in one example. Accordingly, object mapping engine 151 can modify a shape and/or size of the drawing object(s) in view of the modification to the associated text object(s). Further details regarding modifying the shape and/or size of the drawing object(s) are provided with respect to FIGS. 4A-5D. In another example, if the drawing object is a sketch object, object mapping engine 151 can modify the set of text objects that are associated with the drawing object or other text objects included in the electronic document to create a space in the electronic document that is sufficient to accommodate the drawing object. Object mapping engine 151 can modify the drawing object to be presented in the created space, in accordance with embodiments described here. Further details regarding creating space to accommodate a drawing object are provided with respect to FIGS. 6A-6C.

It should be noted that although some embodiments of the present disclosure are directed to an association between text objects and drawing objects in an electronic document, embodiments of the present disclosure can be applied to other types of objects in an electronic document. For example, embodiments of the present disclosure can be directed to an association between image objects (e.g., photographs, clip art, etc.) and drawings in an electronic document. Any reference to an association between text objects and drawing objects is merely for the purpose of illustration and example and is not to be interpreted as limiting.

It should be noted that in some other implementations, the functions of server machines 130, 140, and 150 or platform 120 may be provided by a fewer number of machines. For example, in some implementations server machines 130 and 140 may be integrated into a single machine, while in other implementations server machines 130, 140, and 150 may be integrated into multiple machines. In addition, in some implementations one or more of server machines 130, 140, and 150 may be integrated into platform 120.

In general, functions described in implementations as being performed by platform 120 and/or server machines 130-150 can also be performed on the client devices 102A-N in other implementations, if appropriate. In addition, the functionality attributed to a particular component can be performed by different or multiple components operating together. Platform 120 can also be accessed as a service provided to other systems or devices through appropriate application programming interfaces, and thus is not limited to use in websites.

Although implementations of the disclosure are discussed in terms of platform 120 and users of platform 120 accessing an electronic document, implementations can also be generally applied to any type of documents or files. Implementations of the disclosure are not limited to electronic document platforms that provide document creation, editing, and/or viewing tools to users. Further, implementations of the disclosure are not limited to text objects or drawing objects and can be applied to other types of objects.

In implementations of the disclosure, a "user" can be represented as a single individual. However, other implementations of the disclosure encompass a "user" being an entity controlled by a set of users and/or an automated source. For example, a set of individual users federated as a community in a social network can be considered a "user." In another example, an automated consumer can be an automated ingestion pipeline, such as a topic channel, of platform 120.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over what information is collected about the user, how that information is used, and what information is provided to the user.

Figure 2:
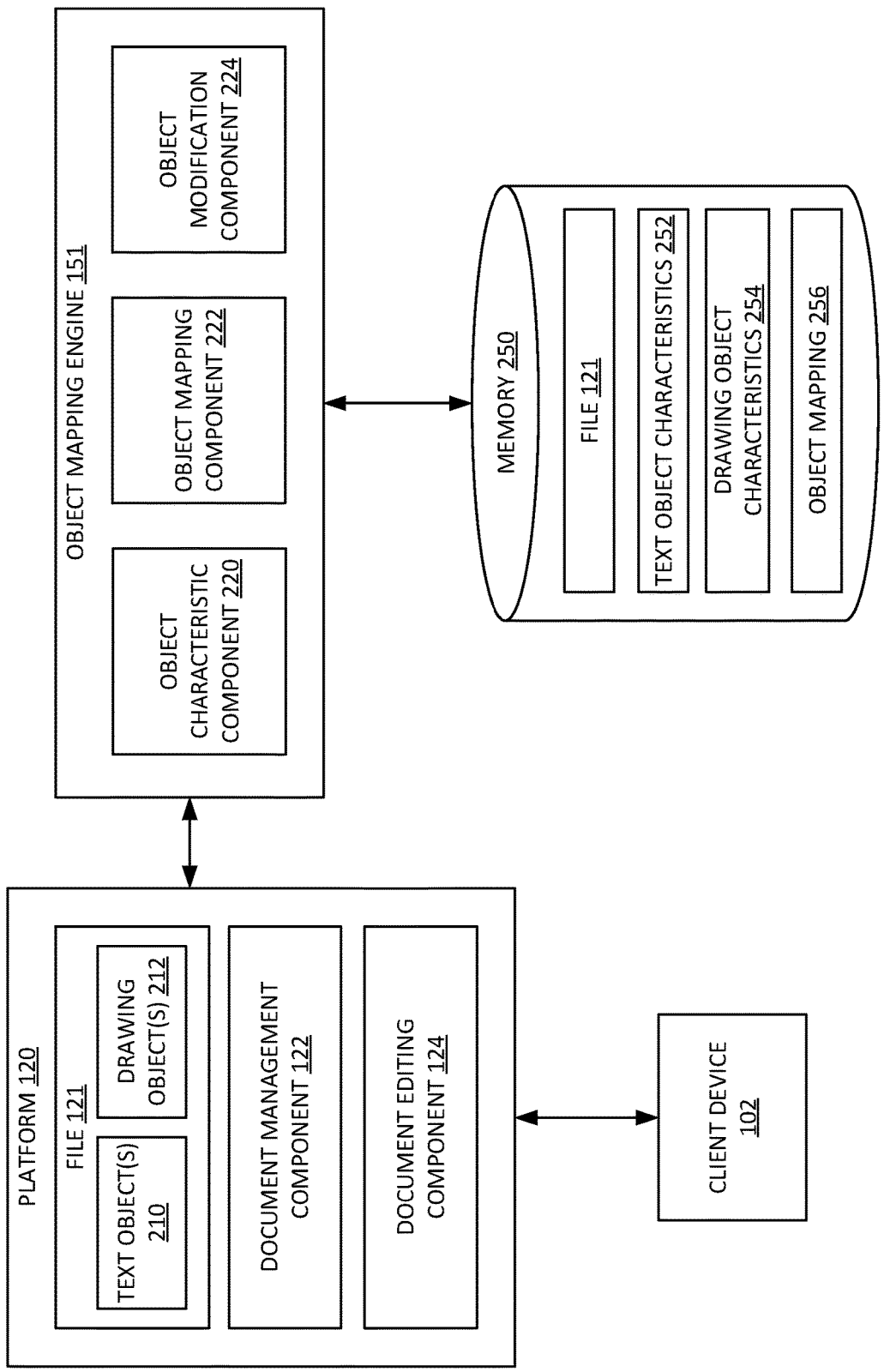
FIG. 2 is a block diagram illustrating an example platform and an object mapping engine, in accordance with implementations of the present disclosure.

FIG. 2 is a block diagram illustrating an example platform 120 and an object mapping engine 151, in accordance with implementations of the present disclosure. In some embodiments, platform 120 can include a file 121, a document management component 122, and/or a document editing component 124, as described with respect to FIG. 1. Platform 120 can be connected (e.g., via network 108) to one or more client devices 102 (e.g., client devices 102A-102N, etc.). File 121 can be a file for an electronic document, such as a word document, a slide presentation document, a spreadsheet document, etc. In some embodiments, the electronic document can include text object(s) 210, drawing object(s) 212, and so forth that are provided and/or edited by a user associated with client device 102 via a platform GUI, as described with respect to FIG. 1. In some embodiments, the electronic document can additionally or alternatively include other types of objects, such as image objects (not shown), etc. Object mapping engine 151 can include an object characteristic component 220, an object mapping component 222, and/or an object modification component 224, as illustrated in FIG. 2. In some embodiments, object mapping engine 151 and/or platform 120 can be connected to memory 250. In some embodiments, portions of memory 250 can correspond to data store 110 described with respect to FIG. 1. Portions of memory 250 can additionally or alternatively correspond to a memory of client device 102 and/or another memory associated with system 100.

As described above, document management component 122 can provide a user with access to an electronic document via a content viewer GUI provided by platform 120 (referred to as platform GUI herein). Document editing component 124 can provide the user with tools to create, modify, and/or remove objects (e.g., content objects, drawing objects, etc.) from the electronic document. In some embodiments, document editing content 124 can provide the platform GUI according to a content editing mode or a drawing editing mode. As described above, a user can provide and/or modify text objects of the electronic document when the platform GUI is provided according to the content editing mode and can provide and/or modify drawing objects of the electronic document when the platform GUI is provided according to the drawing editing mode.

Figure 4A:
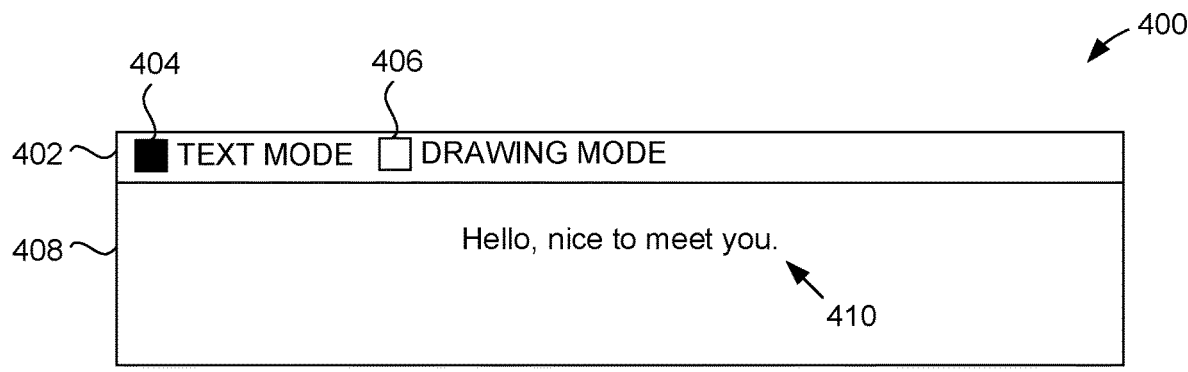
FIGS. 4A-4D illustrate an example of modifying the presentation of drawing objects based on associated text objects in an electronic document, in accordance with implementations of the present disclosure.

FIGS. 4A-4D illustrate an example platform GUI 400 provided to client device 102 by platform 120, in accordance with implementations of the present disclosure. As illustrated in FIG. 4A, platform GUI 400 can include one or more portions (e.g., first portion 402, second portion 408, etc.). First portion 402 can include one or more GUI elements (e.g., element 404, element 406, etc.) that enable a user to transmit a request to switch between a content editing mode and a drawing editing mode, as described above. For example, a user can engage with (e.g., click, tap, select, etc.) element 404 to transmit a request for GUI 400 to be provided according to the content editing mode. While GUI 400 is provided according to the content editing mode, the user can provide and/or modify text objects (e.g., text object 410) within second portion 408 of GUI 400. Text object 410 can correspond to text object(s) 210, described with respect to FIG. 2. In some embodiments, the user can provide and/or modify text object 410 by providing one or more text strings via a peripheral device of or connected to client device 102 (e.g., a keyboard device, a touch screen, etc.). As illustrated in FIG. 4A, the user can provide the text string "Hello, nice to meet you," via a peripheral device of or connected to client device 102. Document editing component 124 can update GUI 400 to include one or more text objects that correspond to the provided text string.

Figure 4B:
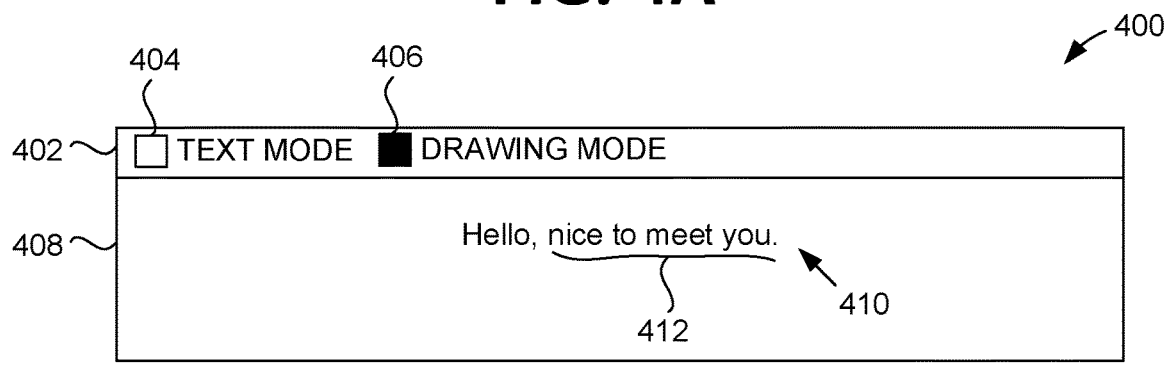

In some embodiments, document editing component 124 can receive a request to provide GUI 400 according to a drawing editing mode. For example, as illustrated in FIG. 4B, the user associated with client device 102 can engage with (e.g., click, tap, select, etc.) element 406 to transmit a request for GUI 400 to be provided according to the drawing editing mode. While GUI 400 is provided according to the drawing editing mode, the user can provide and or modify drawing objects (e.g., drawing object 412) within second portion 408 of GUI 400. Drawing object 412 can correspond to drawing object(s) 212, described with respect to FIG. 2. In some embodiments, the user can provide and/or modify drawing object 412 using a peripheral device of or connected to client device 102 (e.g., a mouse device, a touch screen, etc.). For example, document editing component 124 can provide user with access to a digital writing utensil (e.g., a digital pen, a digital marker, etc.) and user can control the digital writing utensil via the peripheral device. As illustrated in FIG. 4B, the user can provide (e.g., draw) an underline object under text object(s) associated with the text string "nice to meet you." In one example, the underline object may be provided to emphasize or highlight the text object "nice to meet you," relative to other text objects in portion 408.

Referring back to FIG. 2, object characteristic component 220 of object mapping engine 151 can be configured to determine one or more characteristics associated with text object(s) 210 and/or drawing object(s) 212 of the electronic document associated with file 121. In some embodiments, the characteristics of text object(s) 210 and/or drawing object(s) 212 can include coordinates (e.g., Cartesian coordinates, pixel location, etc.) for a location of GUI 400 that include text object(s) 210 and/or drawing object(s) 212. For example, as illustrated in FIG. 4B, text object 410 is included in a first region of portion 408 and drawing object 412 is included in a second region of portion 408 (e.g., below the first region of portion 408 that includes the text object 410). Object characteristic component 220 can determine coordinates for the first region and the second region.

For example, object characteristic component 220 (or another component of platform 120) can store coordinates associated with each object included in the electronic document (e.g., in memory 250) as such object is provided by a user. Object characteristic component 220 can obtain the stored coordinates from memory 250. In another example, object characteristic component 220 can calculate the coordinates for the first region and the second region by determining a position of the text object(s) and/or the drawing object(s) relative to a reference object (e.g., a corner or other fixed point of the electronic document). The determined coordinates for the first region can be stored in memory 250 as text object characteristics data 252, in some embodiments. In additional or alternative embodiments, the determined coordinates for the second region can be stored in memory 250 as drawing object characteristics data 254.

In response to determining the coordinates for the first region and the second region of portion 408, object characteristic component 220 can determine whether second region is proximate to the first region based on a difference between the coordinates for the first region and the coordinates for the second region. For example, object characteristic component 220 can determine whether a proximity of the first region and the second region satisfies a proximity criterion (e.g., whether a difference between the first region and the second region meets or exceeds a proximity threshold) by comparing the first region coordinates to the second region coordinates. In response to determining that the proximity of the first region and the second region satisfies the proximity criterion, object characteristic component 220 can determine that the drawing object 412 is associated with the text object 410. Object characteristic component 220 can provide an indication that the drawing object 412 is associated with the text object 410 to object mapping component 222. In response to determining that the proximity of the first region and the second region does not satisfy the proximity criterion, object characteristic component 220 can determine that the drawing object 412 is not associated with the text object 410. In some embodiments, object characteristic component 220 can identify other text object(s) 210 of the electronic document and can determine whether coordinates of the region(s) that include the other text object(s) and the coordinates of the second region satisfy the proximity criterion, as described above.

In additional or alternative embodiments, object characteristic component 220 can determine whether text object(s) 210 are associated with drawing object(s) 212 based on one or more object association rules (e.g., provided by a user or developer of platform 120). For example, object characteristic component 220 can determine a type of drawing object (e.g., an underline object type, a circle drawing type an arrow drawing type, a sketch drawing type, etc.) that is provided to the electronic document. In some embodiments, object characteristic component 220 can determine the drawing object type by analyzing a shape and/or structure associated with the provided drawing object. For example, object characteristic component 220 can determine that if a width of a provided drawing object falls below a threshold width, a length of the provided drawing object is significantly larger (e.g., 10×, 50×, 100×, etc.) than the width of the provided drawing object, and/or the provided drawing object is provided beneath a set of text object(s), the drawing object is an underline drawing object. In response to determining that the drawing object is an underline drawing object, object characteristic component 220 can determine that the drawing object is associated with the set of text object(s) above the provided drawing object. Given the complexity and variability associated with drawing objects, object characteristic component 220 may not accurately determine each type of drawing object based on a shape and/or structure associated with the provided drawing object. Accordingly, object characteristic component 220 can determine the drawing object type using one or more machine learning models, such as drawing type model 332 described in further details with respect to FIG. 3.

In response to determining that drawing object(s) 212 are associated with text object(s) 210, object characteristic component 220 can provide an indication of the association to object mapping component 222. Object mapping component 222 can be configured to generate a mapping between the text object(s) 210 and the drawing object(s) 212. In some embodiments, object mapping component 222 can generate the mapping by generating a pointer between the text object(s) and the drawing object(s) 212 and storing the pointer in memory 250 as object mapping 256. The generated mapping 256 can indicate to object modification component 224 (and to other components of object mapping engine 151) that text object(s) 210 are associated with drawing object(s) 212.

Figure 4C:
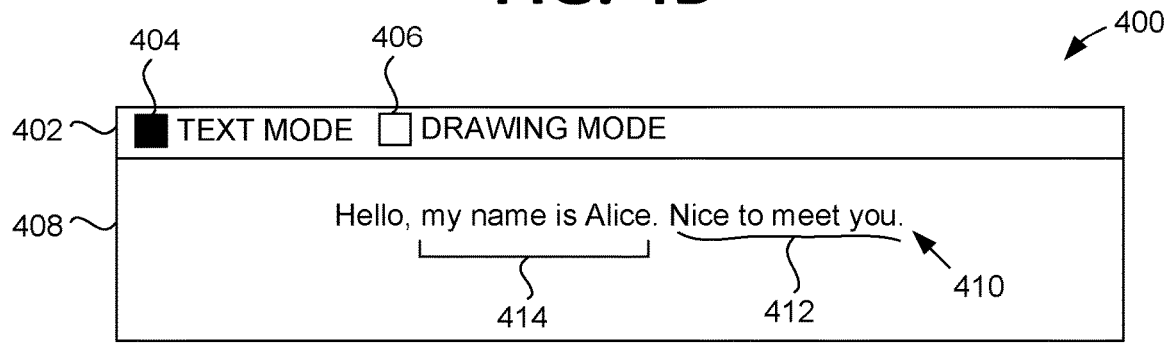

Referring now to FIG. 4C, a user can engage with element 404 to transmit a request that GUI 400 is provided according to the content editing mode, as described above. In some embodiments, the user can modify the text object(s) included in portion 408 when GUI 400 is included in the content editing mode. For example, the user can provide (e.g., via a peripheral device of or connected to client device 102) additional text objects 414 (e.g., the text string "my name is Alice") in portion 408. The placement of the additional text objects 414 can cause a portion of text objects 410 to shift from an initial location in region 208 to a subsequent location in region 208. For example, as illustrated in FIG. 4C, the text objects of "nice to meet you" have shifted towards the right side of GUI 400 to accommodate the additional text objects 414 provided to portion 408. Object modification component 224 can detect the modification to text objects 210 (e.g., by detecting that the user has added text objects 414 to portion 408). In response to detecting the modification to text objects 210, object modification component 224 can determine that text object(s) 210 are associated with drawing object(s) 212 based on the object mapping 256 stored in memory 250. Accordingly, object modification component 224 can modify the presentation of the drawing object(s) 212 in accordance with the modification to text object(s) 210. For example, as illustrated in FIG. 4C, object modification component 224 can cause drawing object 212 to shift from an initial location in region 208 to a subsequent location in region 208. The subsequent location of drawing object 212 in region 208 can correspond to the subsequent location of the text object 210 in region 208. As illustrated in FIG. 4C, drawing object 412, which was drawn underneath text object 410, is shifted to be presented underneath text object 210 after text object(s) 414 are added to region 208.

Figure 4D:
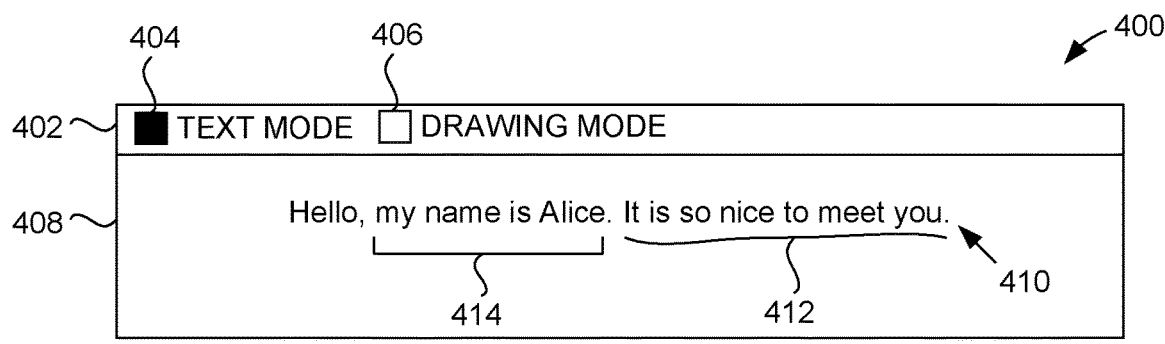

In another illustrative example, the user can, in some embodiments, edit or otherwise modify text object 410 (i.e., that is associated with drawing object 412). For example, the user can modify text object 410 to update the text string of "Nice to meet you," to include "It is so nice to meet you," as illustrated in FIG. 4D. The modification to text object 410 can increase the size of the region that includes text object 410. Object modification component 224 can modify drawing object 412 in accordance with the increased size of the region that includes text object 410. For example, as illustrated in FIG. 4D, the length of drawing object 412 is increased to be presented underneath the text string "It is so nice to meet you."

Figure 5A:
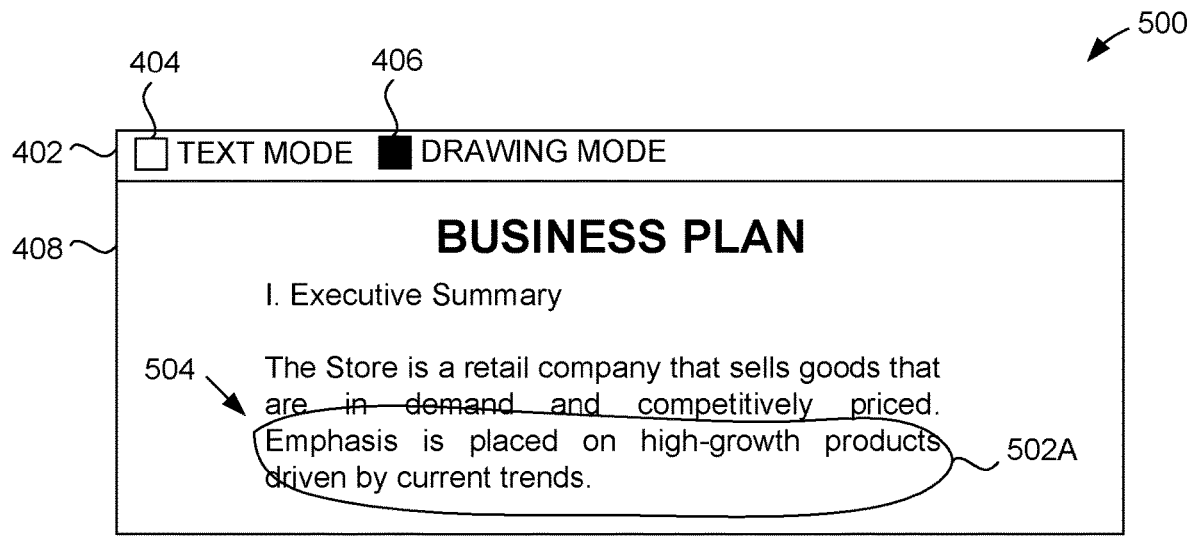
FIGS. 5A-5D illustrate another example of modifying the presentation of drawing objects based on associated text objects in an electronic document, in accordance with implementations of the present disclosure.

FIGS. 5A-5D illustrate another example of modifying the presentation of drawing objects based on associated text objects in an electronic document, according to implementations of the present disclosure. FIGS. 5A-5D illustrate an example platform GUI 500 provided by platform 120 to client device 102, as described above. GUI 500 can include similar regions and/or elements as GUI 400. As illustrated in FIG. 5A, a user associated with client device 102 can provide text object(s) 212 to be included in an electronic document, in accordance with previously described embodiments. The user can provide the text object(s) 212 when GUI 500 is provided in accordance with the content editing mode, as described above. The user can also provide a drawing object (e.g., drawing object 502A) to emphasize a portion of text objects 212 (e.g., text objects 504) included in portion 408 of GUI 500 when GUI 500 is provided in accordance with the drawing editing mode, as described above. Object characteristic component 220 can determine that drawing object 502A is associated with text objects 504, in accordance with previously described embodiments. For example, object characteristic component 220 can determine the coordinates for the region of portion 408 that include text objects 504 and the coordinates for the region of portion 408 that include drawing object 502A, as described above. Object characteristic component 220 can compare the coordinates for text objects 504 to the coordinates for drawing object 502A and can determine that drawing object 502A is proximate to text objects 504 based on the comparison (e.g., the coordinates for drawing object 502A and text object 504 satisfy a proximity criterion). Accordingly, object characteristic component 220 can determine that drawing object 502A is associated with text objects 504.

Figure 3:
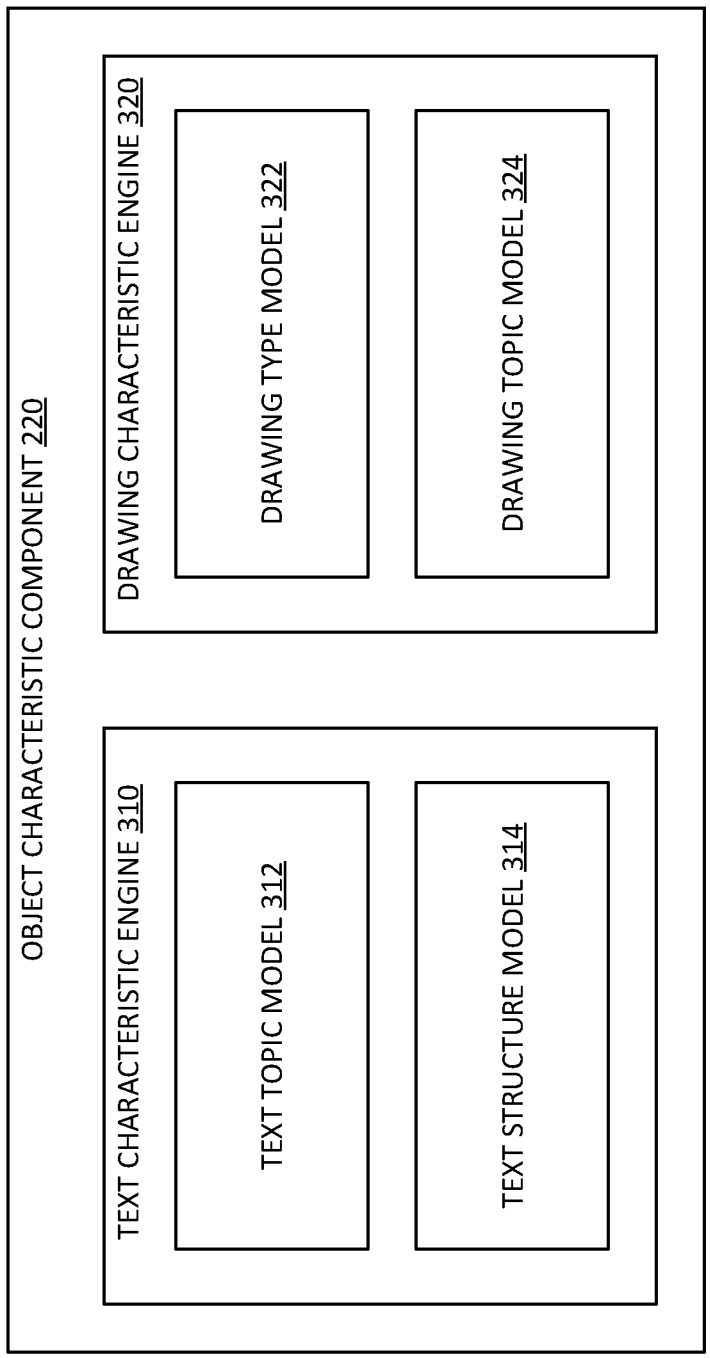
FIG. 3 is a block diagram illustrating an example object characteristic component, in accordance with implementations of the present disclosure.

In some embodiments, object characteristic component 220 can determine a topic associated with text objects 504 and/or drawing object 502A. FIG. 3 illustrates an example object characteristic component 220, according to implementations of the present disclosure. As illustrated in FIG. 3, object characteristic component 220 can include a text characteristic engine 310 and a drawing characteristic engine 320. Text characteristic engine 310 can be configured to provide text objects (e.g., text objects 504) as input to a text topic model 312. Text topic model 312 can be trained (e.g., by training engine 141 using training data generated by training set generator 131) to predict a topic associated with given input text objects, in accordance with previously described embodiments. In some embodiments, text characteristic engine 310 can be further configured to provide text objects as input to a text structure model 314. Text structure model 314 can be trained (e.g., by training engine 141 using training data generated by training set generator 131) to predict a grammatical structure associated with given text objects, in accordance with previously described embodiments. It should be noted that although FIG. 3 illustrates text topic model 312 and text structure model 314 as separate machine learning models, in some embodiments, text topic model 312 and text structure model 314 can be a single machine learning model. Accordingly, object characteristic component 220 may determine a topic and a grammatical structure associated with given text objects based on one or more outputs of the single machine learning model.

Drawing characteristic engine 320 can be configured to provide drawing objects (e.g., drawing object 502A) as input to a drawing type model 322. Drawing type model 322 can be trained (e.g., by training engine 141 using training data generated by training set generator 131) to predict a type of drawing object (e.g., an underline, a circle, an arrow, a sketch, etc.) associated with a given input drawing object. Drawing characteristic engine 320 can include a drawing topic model 324. Drawing topic model 322 can be trained (e.g., by training engine 141 using training data generated by training set generator 131) to predict a topic associated with a given input drawing object, in accordance with previously described embodiments. It should be noted that although FIG. 3 illustrates drawing type model 322 and drawing topic model 324 as separate machine learning models, in some embodiments, drawing type model 322 and drawing topic model 324 can be a single machine learning model. Accordingly, object characteristic component 220 may determine a drawing object type and a drawing object topic associated with given drawing objects based on one or more outputs of the single machine learning model.

Referring back to FIG. 5A, object characteristic component 220 can provide text object 504 as input to text topic model 312 and can obtain one or more outputs of text topic model 312. In some embodiments, the one or more outputs of text topic model 312 can include an indication of one or more content topics and an indication of a level of confidence that each of the respective content topics correspond to text object 504. Object characteristic component 220 can identify the content topic with the level of confidence that satisfies a level of confidence criterion (e.g., is the largest level of confidence indicated in the one or more outputs, meets or exceeds a threshold level of confidence, etc.). Object characteristic component 220 can determine that the identified topic corresponds to the topic of the text object 504 and can update text object characteristic data 252 to include the determined topic associated with text objects 504.

In additional or alternative embodiments, object characteristic component 220 can provide text object 504 as input to text structure model 314 and can obtain one or more outputs of text structure model 312. The one or more outputs of text structure model 312 can include an indication of one or more grammatical structures and an indication of a level of confidence that each of the respective grammatical structures correspond to text object 504. Object characteristic component 220 can identify the grammatical structure with the level of confidence that satisfies a level of confidence criterion, as described above. Object characteristic component can determine that the identified grammatical structure corresponds to the grammatical structure of the text object 504 and can update text object characteristic data 252 to include the determine grammatical structure.

Object characteristic component 220 can also provide drawing object 502A as inputs to as drawing type model 322 and/or drawing topic model 324 and can determine a type and/or topic associated with drawing object 502A based on one or more outputs of drawing type model 322 and/or drawing topic model 324. One or more outputs of drawing type model 322 and/or drawing topic model 324 can include drawing object types and/or drawing object topics and a level of confidence that a respective drawing object type and/or topic corresponds to drawing object 502A. Object characteristic component 220 can identify a drawing object type and/or topic that has a level of confidence that satisfies a level of confidence criterion, as described above. Object characteristic component 220 can update drawing object characteristics data 254 to include an indication of the identified drawing object type and/or drawing object topic. In some embodiments, object characteristic component 220 may not be able to determine a topic associated with drawing object 502A based on one or more outputs of drawing topic model 324. For example, object characteristic component 220 can determine that drawing object 502A corresponds to a circle drawing object (e.g., based on one or more outputs of drawing type model 322). However, as a circle drawing object does not necessarily correspond to a content topic, object characteristic component 220 may not determine a topic associated with drawing object 502A based on one or more outputs of drawing topic model 324. In such embodiments, object characteristic component 220 may update drawing object characteristics data 254 to indicate the determined object type associated with drawing object 502A, but may not update drawing object characteristics data 254 to indicate an object topic.

In some embodiments, object characteristic component 220 can determine whether the topic associated with text objects 504 corresponds to a topic associated with drawing object 502A and, if so, object characteristic component 220 can determine that drawing object 502A is associated with text objects 504. Accordingly, object mapping component 224 can generate a mapping between text objects 504 and drawing object 502A, as described above.

Figure 5B:
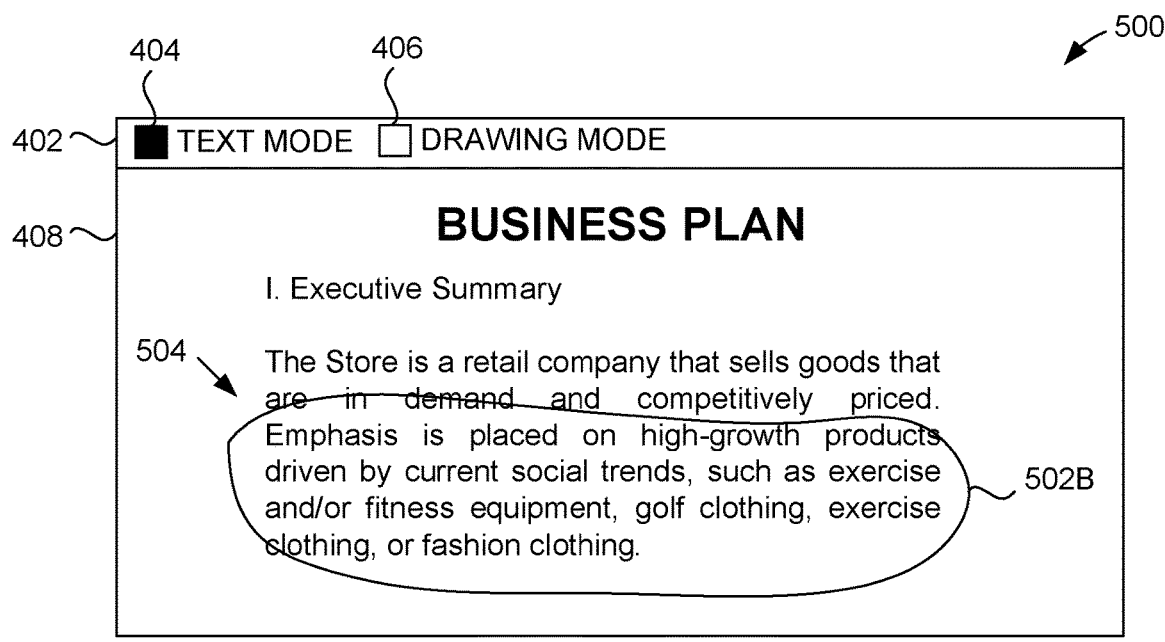

In some embodiments, the user can engage with element 404 to transmit a request for GUI 500 to be provided in accordance with the content editing mode, as described above. When GUI 500 is provided in accordance with the content editing mode, the user can provide (e.g., using a peripheral device) additional text objects to be included in portion 408 of GUI 500. For example, as illustrated in FIG. 5A, the text objects 504 (e.g., emphasized by drawing object 502A) can include the text string(s) that provide "[e]mphasis is placed on high-growth products driven by current trends." As illustrated in FIG. 5B, the user can provide additional text objects such that the text string(s) provide "[e]mphasis is placed on high-growth products driven by current social trends such as exercise and/or fitness equipment, golf clothing, exercise clothing, or fashion clothing."

Object characteristic component 220 can determine whether the additional text objects provided by the user correspond to text objects 504 that are emphasized by drawing object 502A in portion 408. In some embodiments, object characteristic component 220 can provide the additional text objects as input to text topic model 312, as described above, and can determine a topic associated with the additional text objects based on one or more outputs of the text topic model 312. Object characteristic component 220 can compare the determined topic associated with the additional text objects with the topic associated with text objects 504 (e.g., included in text object characteristics data 252) to determine whether the topic of the additional text objects corresponds to the topic of text objects 504. In an illustrative example, object characteristic component 220 can determine that the topic associated with object 504 corresponds to products sold by a retail company. Object characteristic 220 can determine that the topic associated with the additional text objects in portion 408 correspond to types of products sold by a retail company, which corresponds to the topic associated with text objects 504. Accordingly, object characteristic component 220 can determine that the additional text objects correspond to text objects 504.

In additional or alternative embodiments, object characteristic component 220 can determine whether the additional text objects provided by the user correspond to text objects 504 based on a grammatical structure associated with the additional text objects and text objects 504. For example, object characteristic component 220 can provide the additional text objects as input to text structure model 314, as described above, and can obtain one or more outputs of the text structure model 314. Object characteristic component 220 can determine a grammatical structure associated with the additional text objects, in accordance with previously described embodiments. Object characteristic component 220 can compare the determined grammatical structure associated with the additional text objects to the grammatical structure associated with text objects 504 (e.g., included in text object characteristics data 252) to determine whether the grammatical structure of the additional text objects corresponds to the grammatical structure associated with text objects 504. In response to determining that the grammatical structure of the additional text objects corresponds to the grammatical structure of text objects 504, object characteristic component 220 can determine that the additional text objects correspond to text objects 504.

In response to object characteristic component 220 determining that the additional text objects correspond to text objects 504, object mapping component 222 can update object mapping 256 to indicate that drawing object 502A is associated with text objects 504 and the additional text objects. Object modification component 226 can modify drawing object 502A to include the additional text objects that correspond to text objects 504 in view of the updated object mapping 256. For example, object modification component 226 can identify a region of portion 408 that includes both text objects 504 and the additional text objects. Object modification component 226 can increase a size of drawing object 502A to correspond to a size of the identified region of portion 408. As illustrated in FIG. 5B, object modification component 226 has modified drawing object 502A (illustrated as modified drawing object 502B) to be increased such to emphasize both text objects 504 and the additional text object provided by the user associated with client device 102.

As indicated above, although embodiments of the present disclosure are directed to an association of text objects with drawing objects, embodiments of the present disclosure can be applied to an association of other types of objects (e.g., image objects) with drawing objects. For example, a user associated with client device 102 can provide a drawing object proximate to an image object included in a region of platform GUI, in accordance with previously described embodiments. In some embodiments, object characteristic component 220 can provide the image object as input to an object detection and/or classification machine learning model, which is trained to detect objects included in given input images and/or predict an object class associated with the detected objects. Object characteristic component 220 can obtain one or more outputs of the object detection and/or classification model based on the given input image object. The one or more outputs of the object detection and/or classification model can include an indication of regions of the image object and a level of confidence that a respective region includes an object representation. The one or more outputs can additionally or alternatively include an indication of a class associated with the respective object representation and an additional level of confidence that the respective class corresponds to the respective object representation. Object characteristic component 220 can select the region of the image object and the class having levels of confidence that satisfy a level of confidence criterion, as described above. The class of the object representation included in the selected region can correspond to the topic associated with the image object. Object characteristic component 220 can store the determined image topic in memory 250, and can determine whether a drawing object is associated with the image object based on the determined image topic, in accordance with previously described embodiments.

Figure 5C:
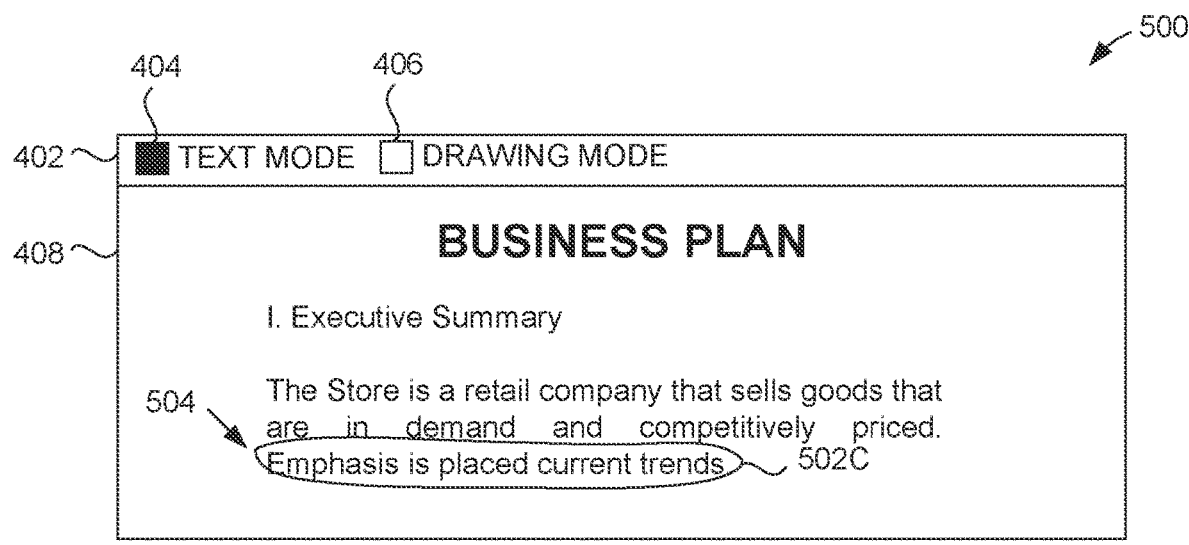

As illustrated in FIG. 5C, the user associated with client device 102 can modify text objects 504 by removing or deleting a portion of the text string associated with text objects 504. For example, the user can modify the text strings associated with text objects 504 such that the only portion of the text string that remains is "[e]mphasis is placed on current trends." Object modification component 226 can detect that text objects 504 are modified and can modify a size of drawing object 502A (or drawing object 502C) in accordance with the modification to text objects 504. For example, as illustrated in FIG. 5C, object modification component 226 has modified drawing object 502A (illustrated as modified drawing object 502C) to be decreased such to emphasize the remaining portion of the text string of modified text objects 504.

Figure 5D:
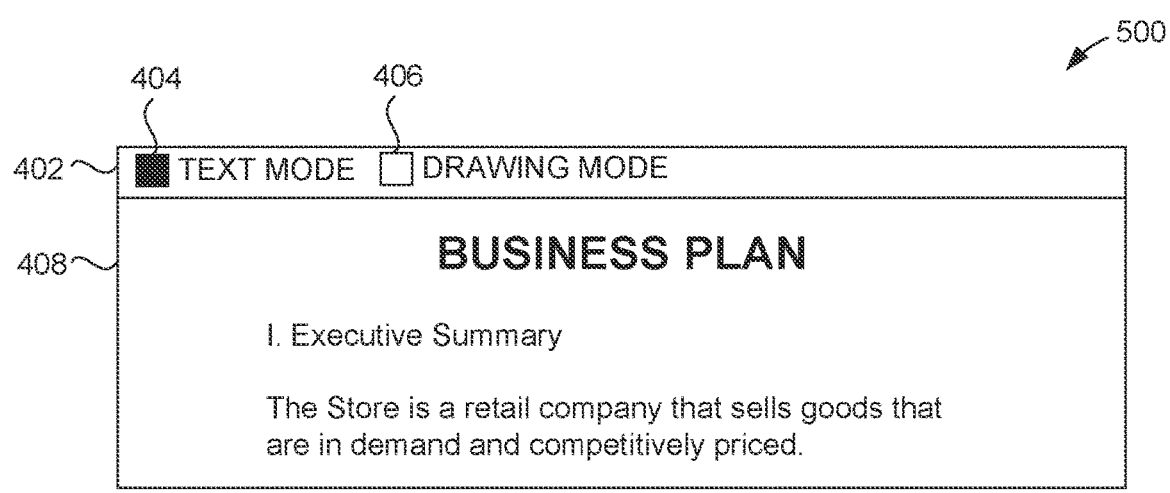

In some embodiments, a user can remove text objects 504 from portion 408 of GUI 500. In such embodiments, object modification 226 can remove drawing object 502A from region 408 in view of the mapping between text objects 504 and drawing object 502A. As illustrated in FIG. 5D, the user associated with client device 102 has removed text objects 504 from portion 408 of GUI 500. Accordingly, object modification component 226 has removed drawing object 502A from portion 408.

Figure 6A:
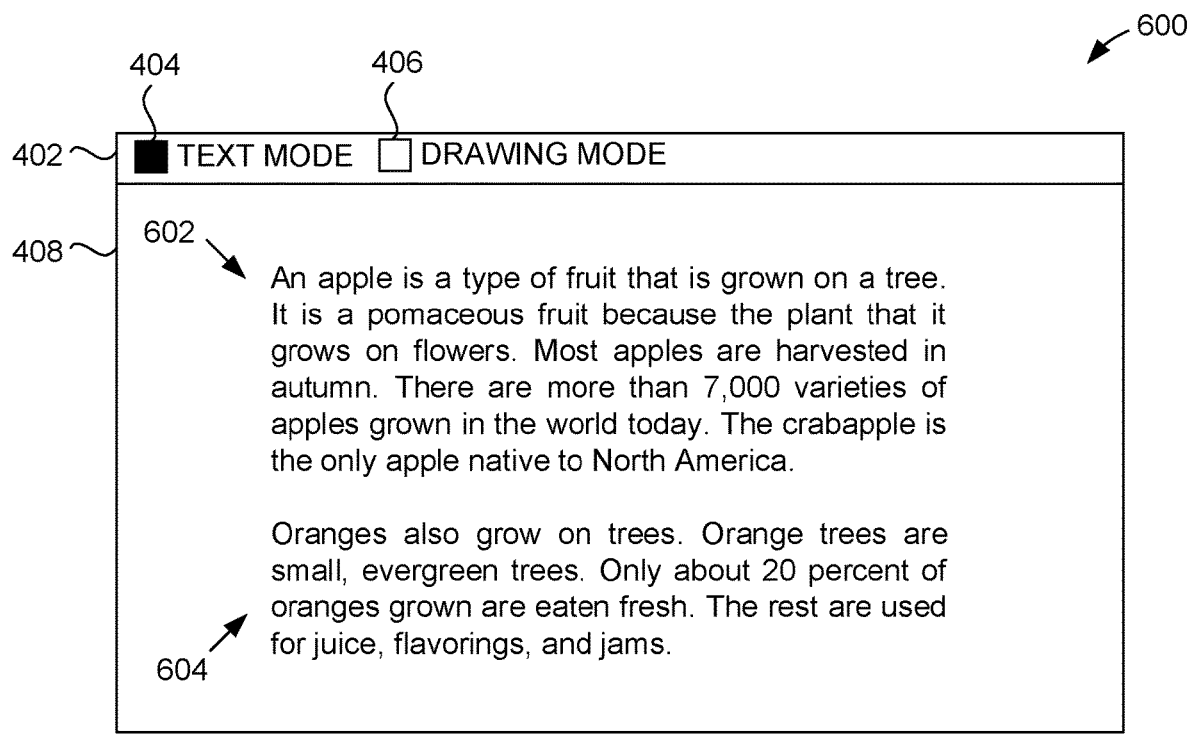
FIGS. 6A-6C illustrate an example of inserting a drawing object into an electronic document based on characteristics of associated text objects in the electronic document, in accordance with implementations of the present disclosure.
Figure 6B:
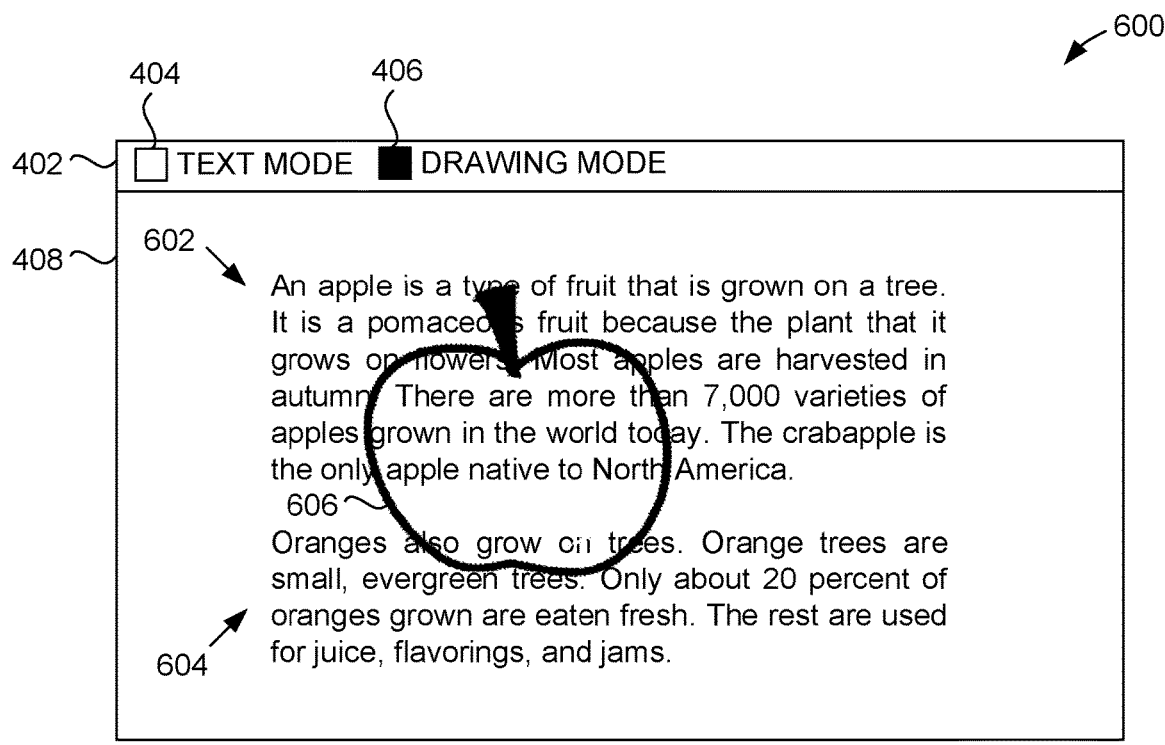
Figure 6C:
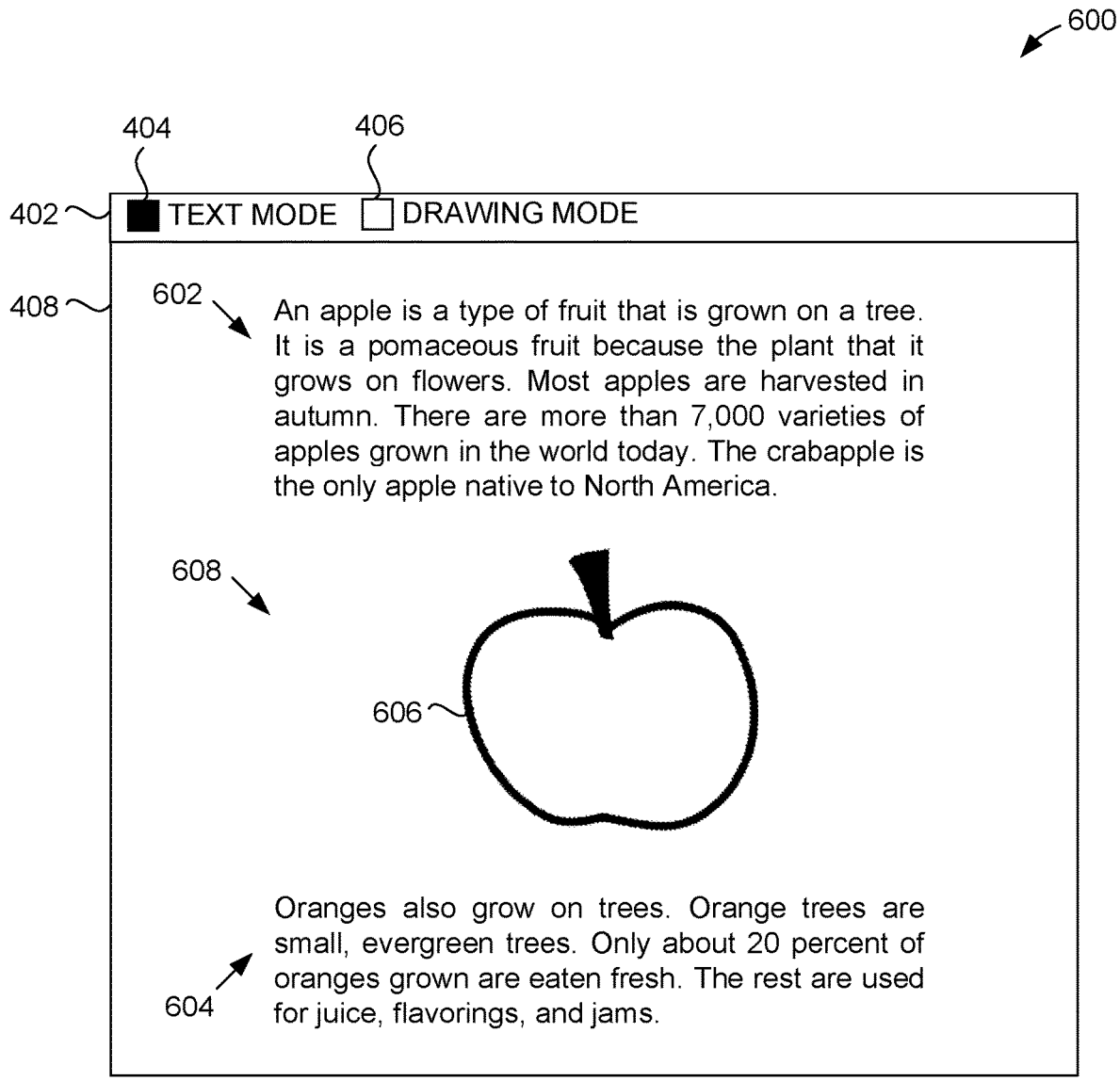

FIGS. 6A-6C illustrate yet another example of modifying the presentation of drawing objects based on associated text objects in an electronic document, according to implementations of the present disclosure. FIGS. 6A-6C illustrate an example platform GUI 600 provided by platform 120 to client device 102, as described above. GUI 600 can include similar regions and/or elements as GUI 400 and/or GUI 500. As illustrated in FIG. 6A, a user associated with client device can provide first text objects 602 (e.g., corresponding to a paragraph describing apples) and second text objects 604 (e.g., corresponding to a paragraph describing oranges) to be included in an electronic document (e.g., when GUI 600 is provided in accordance with a content editing mode). In some embodiments, first text objects 602 are included in a first region of portion 408 and second text objects 604 are included in a second region of portion 408. As illustrated in FIG. 6B, the user can provide drawing object 606 (e.g., a sketch of an apple) to be included in portion 408 of GUI 600 (e.g., when GUI 600 is provided in accordance with a drawing editing mode). In some embodiments, the user can provide drawing object 606 over top of first text objects 602 and second text objects 604. In other or similar embodiments, the user can provide drawing object 606 in another region of portion 408 (e.g., next to text objects 602 and/or 604, underneath text objects 604, etc.).

In response to detecting that the user has finished providing drawing object 606 (e.g., in response to receiving a request to provide GUI 600 according to the content editing mode), object characteristic component 220 can determine whether drawing object 606 is associated with text objects 602 and/or text objects 604, as described above. For example, object characteristic component 220 can provide text objects 602 as input to text topic model 312 and can determine that a topic of text objects 602 is "apples" based on one or more outputs of text topic model 312, in accordance with previously described embodiments. Object characteristic component 220 can additionally or alternatively provide text objects 604 as input to text topic model 312 and can determine that a topic of text objects 604 is "oranges"

based on one or more outputs of the text topic model 312. Object characteristic component 220 can also provide drawing object 606 as input to drawing type model 322 and/or drawing topic model 324 and can determined, based on one or more outputs of drawing type model 322 and/or drawing topic model 324 that drawing object 606 is a sketch and is associated with a topic of "apples" (e.g., as drawing 606 is a sketch of an apple). Object characteristic component 220 can compare the topics of text objects 602 and text objects 604 to the topic of drawing object 606 to determine whether drawing object 606 is associated with text objects 602 and/or text objects 604. As the topics of text objects 602 and drawing object 606 are both "apples," object characteristic component 220 can determine that drawing object 606 is associated with text objects 602. As the topic of text objects 604 is "oranges" and the topic of drawing object 606 is "apples," object characteristic component can determine that drawing object 606 is not associated with text objects 604. Object characteristic component 220 can determine whether drawing object 606 is associated with text objects 602 and/or text objects 604 according to additional or alternative techniques, in accordance with previously described embodiments.

Object mapping component 222 can generate a mapping between drawing object 606 and text objects 602, as described above. Object modification component 224 can modify portion 408 of GUI 600 to accommodate drawing object 606 in view of the generated mapping. For example, object modification component 224 can detect (e.g., based on coordinates associated with a first region that includes text objects 602, a second region that includes text objects 604, and/or a third region that includes drawing object 606) that drawing object 606 is provided over top of text objects 602 and text objects 604. Object modification component 224 can move text objects 604 to a fourth region of portion 408 such to create a space between text objects 602 and text objects 604 that is sufficient to accommodate drawing object 606. As illustrated in FIG. 6C, object modification component 224 has moved text objects 604 to a fourth region of portion 408 to create space 608. Space 608 is sufficiently large to accommodate drawing object 606. Object modification component 224 can move drawing object 606 from the third region of portion 408 to space 608. It should be noted that object modification component 224 creating space 608 below text objects 604 is provided for purpose of illustration only. In one example, object modification component 224 can move text objects 602 to create space 608 above text objects 602 (e.g., so that drawing object 606 is provided above text objects 602). In another example, object modification component 224 can format at least a portion of text objects 602 to the left or the right of portion 408 to create space 608 to the right or the left of text objects 602 (e.g., so that drawing object 606 is provided next to text objects 602). In some embodiments, object modification component 224 can determine a region of portion 408 that is to include space 608 based on one or more rules associated with electronic documents (e.g., provided by a user or developer of platform 120) or by identifying the region of portion 408 that is able to accommodate drawing object 606 (e.g., a region of portion 408 that includes text objects that can be moved or modified to accommodate drawing object 606).

Figure 7:
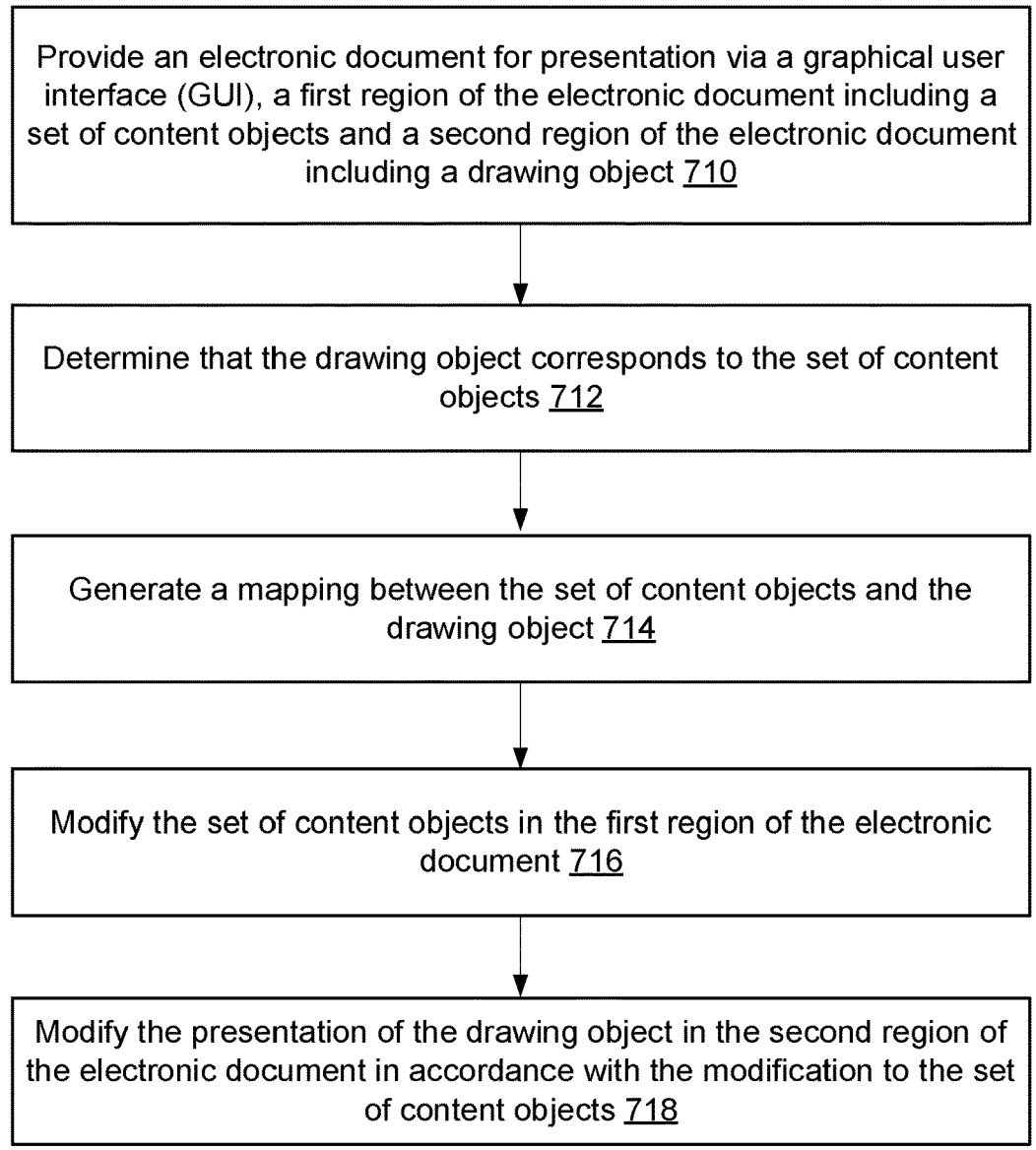
FIG. 7 depicts a flow diagram of an example method for modifying the presentation of drawing objects based on associated text objects in an electronic document, in accordance with implementations of the present disclosure.

FIG. 7 depicts a flow diagram of an example method 700 for modifying a drawing object based on updates to associated text objects in an electronic document, in accordance with implementations of the present disclosure. Method 700 can be performed by processing logic that can include hardware (circuitry, dedicated logic, etc.), software (e.g., instructions run on a processing device), or a combination thereof. In one implementation, some or all the operations of method 700 can be performed by one or more components of system 100 of FIG. 1.

At block 710, processing logic provides an electronic document for presentation via a graphical user interface (GUI). A first region of the electronic document can include a set of content objects (e.g., a text object, an image object, etc.) and a second region of the electronic document can include a drawing object.

At block 712, processing logic can determine that the drawing object corresponds to the set of content objects. Processing logic can determine that the drawing object corresponds to the set of content objects (e.g., text objects, drawing objects, etc.) based on first object characteristics associated with the set of content objects and second object characteristics associated with the drawing object. In some embodiments, processing logic can determine that the drawing object corresponds to the set of content objects responsive to determining that an editing mode associated with the electronic document is modified from a first editing mode (e.g., a drawing editing mode) to a second editing mode (e.g., a content editing mode).

In some embodiments, the first object characteristics include one or more first coordinates of the first region of the electronic document that include the set of content objects. The second object characteristics can include second coordinates of the second region of the electronic document that include the drawing object. Processing logic can determine that the drawing object corresponds to the set of content objects by determining that a proximity of the one or more second coordinates to the one or more first coordinates satisfies a proximity criterion.

In other or similar embodiments, processing logic can provide the set of content objects as input to a first machine learning model (e.g., text topic model 312, etc.). The first machine learning model can be trained to predict, for a given set of content objects, a content topic associated with the given set of content objects. Processing logic can obtain one or more outputs of the first machine learning model which identify one or more content topics and, for each of the one or more content topics, an indication of a level of confidence that a respective content topic is associated with the set of content objects. Processing logic can determine the content topic associated with the set of content objects from the one or more identified content topics based on the indicated level of confidence of each respective content topic of the obtained outputs. The determined content topic is included in the first object characteristic associated with the set of content objects. Processing logic can provide the drawing object as input to a second machine learning model (e.g., drawing topic model 324, etc.). The second machine learning model can be trained to predict, for a given drawing object, a drawing topic associated with the given drawing object. Processing logic can obtain one or more outputs of the second machine leaning model, which identify one or more drawing topics and, for each of the one or more drawing topics, an indication of a level of confidence that a respective drawing topic is associated with the drawing objects. Processing logic can determine the drawing topic associated with the drawing object from the one or more identified drawing topics based on the indicated level of confidence of each respective drawing topic of the obtained outputs. The determined drawing topic is included in the second object characteristic associated with the drawing object. Processing logic can determine that the drawing object corresponds to the set of content objects by determining that the drawing topic associated with the drawing object corresponds to the content topic associated with the set of content objects.

At block 714, processing logic generates a mapping between the set of content objects and the drawing object. At block 716, processing logic modifies the set of content objects in the first region of the electronic document. In other or similar embodiments, processing logic can identify a modification to the set of content objects (e.g., in response to a detection of a user interaction via the platform GUI, etc.). At block 718, processing logic modifies the presentation of the drawing object in the second region of the electronic document in accordance with the modification to the set of content objects. The presentation of the drawing object can be modified in view of the mapping between the set of content objects and the drawing object.

In one illustrative example, processing logic can modify the set of content objects by adding additional content objects to the set of content objects in the first region of the electronic document. Processing logic can modify the presentation of the drawing object in the second region of the electronic document by increasing a size of the drawing object in view of a size associated with the additional content objects. In another illustrative example, processing logic can modify the set of content objects by removing content objects to the set of content objects in the first region of the electronic document. Processing logic can modify the presentation of the drawing object in the second region of the electronic document by decreasing a size of the drawing object in view of a size associated with the removed content objects. In yet another illustrative example, processing logic can modify the set of content objects by removing the set of content objects from the first region of the electronic document. Processing logic can modify the presentation of the drawing object in the second region of the electronic document by removing the drawing object from the second region of the electronic document.

Figure 8:
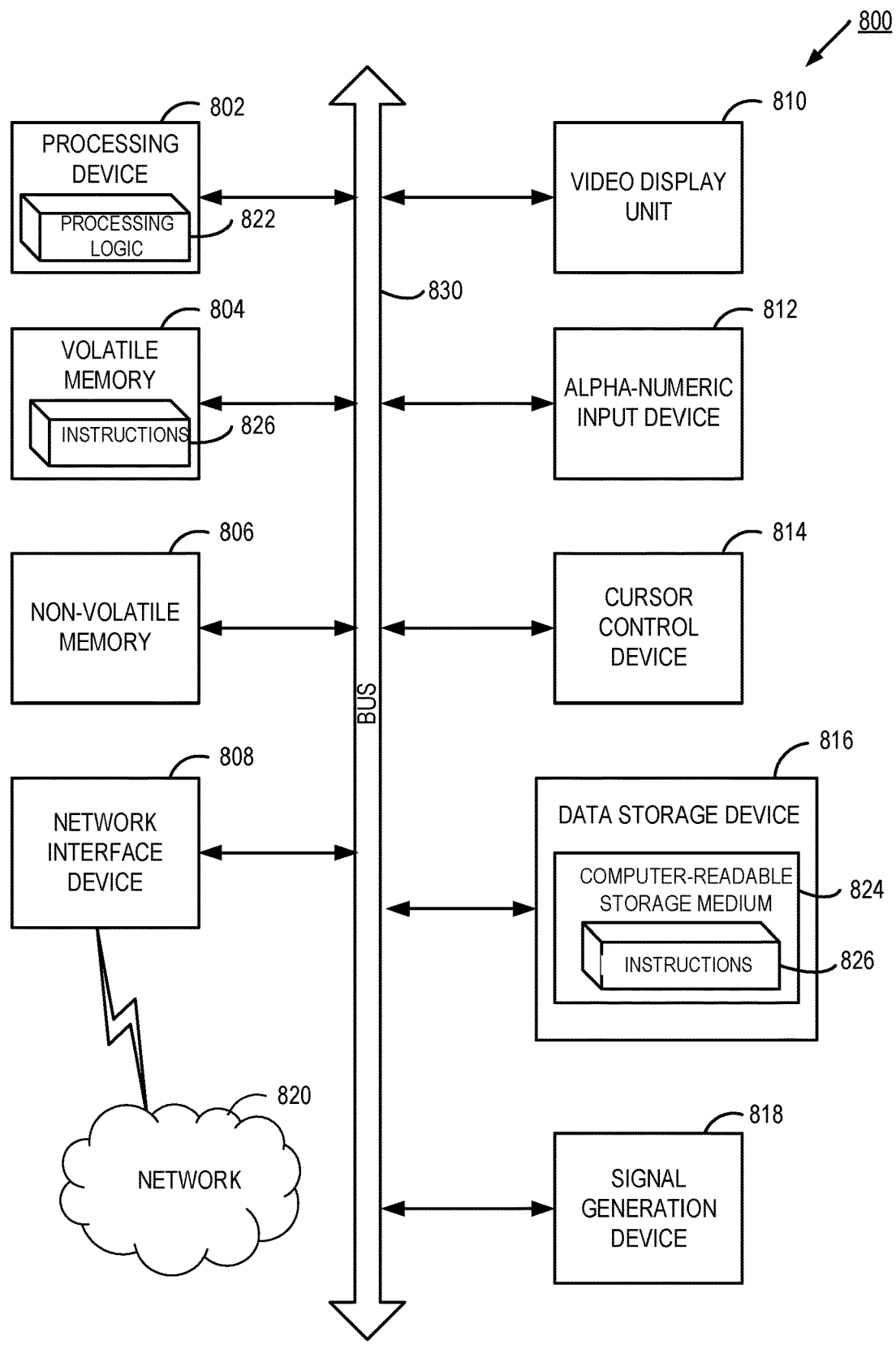
FIG. 8 is a block diagram illustrating an exemplary computer system, in accordance with implementations of the present disclosure.

FIG. 8 is a block diagram illustrating an exemplary computer system 1000, in accordance with implementations of the present disclosure. The computer system 800 can correspond to platform 120 and/or client devices 102A-N, described with respect to FIG. 1. Computer system 800 can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processing device (processor) 802, a main memory 804 (e.g., read-only memory (ROM), flash memory, dynamic random access memory (DRAM) such as synchronous DRAM (SDRAM), double data rate (DDR SDRAM), or DRAM (RDRAM), etc.), a static memory 806 (e.g., flash memory, static random access memory (SRAM), etc.), and a data storage device 818, which communicate with each other via a bus 840.

Processor (processing device) 802 represents one or more general-purpose processing devices such as a microprocessor, central processing unit, or the like. More particularly, the processor 802 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 can also be one or more special-purpose processing devices such as an application specific integrated circuit (ASIC), a field programmable gate array (FPGA), a digital signal processor (DSP), network processor, or the like. The processor 802 is configured to execute instructions 805 (e.g., for predicting channel lineup viewership) for performing the operations discussed herein.

The computer system 800 can further include a network interface device 808. The computer system 800 also can include a video display unit 810 (e.g., a liquid crystal display (LCD) or a cathode ray tube (CRT)), an input device 812 (e.g., a keyboard, and alphanumeric keyboard, a motion sensing input device, touch screen), a cursor control device 814 (e.g., a mouse), and a signal generation device 820 (e.g., a speaker).

The data storage device 818 can include a non-transitory machine-readable storage medium 824 (also computer-readable storage medium) on which is stored one or more sets of instructions 805 (e.g., for modifying the presentation of drawing objects based on associated text objects in an electronic document) embodying any one or more of the methodologies or functions described herein. The instructions can also reside, completely or at least partially, within the main memory 804 and/or within the processor 802 during execution thereof by the computer system 800, the main memory 804 and the processor 802 also constituting machine-readable storage media. The instructions can further be transmitted or received over a network 830 via the network interface device 808.

In one implementation, the instructions 805 include instructions for overlaying an image depicting a conference call participant with a shared document. While the computer-readable storage medium 824 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," "one embodiment," "an implementation," or "an embodiment," means that a particular feature, structure, or characteristic described in connection with the implementation and/or embodiment is included in at least one implementation and/or embodiment. Thus, the appearances of the phrase "in one implementation," or "in an implementation," in various places throughout this specification can, but are not necessarily, referring to the same implementation, depending on the circumstances. Furthermore, the particular features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collect data is anonymized prior to performing any analysis to obtain any statistical patterns so that the identity of the user cannot be determined from the collected data.

What is claimed is:

1. A method comprising:
   providing an electronic document for presentation via a graphical user interface (GUI), wherein a first region of the electronic document comprises a set of content objects and a second region of the electronic document comprises a drawing object;
   determining, based on first object characteristics associated with the set of content objects and second object characteristics associated with the drawing object, whether the drawing object corresponds to the set of content objects;
   responsive to determining that the drawing object corresponds to the set of content objects, generating a mapping between the set of content objects and the drawing object;
   identifying a modification to the set of content objects in the first region of the electronic document based on a user interaction with one or more GUI elements of the GUI that correspond to the set of content objects, wherein the modification to the set of content objects comprises at least one of:
      an addition of one or more additional content objects to the set of one or more content objects,
      a removal of one or more content objects from the set of content objects, or
      a change in at least one of a size or a position of one or more content objects of the set of content objects; and
   responsive to the modification to the set of content objects in the first region, modifying a presentation of the drawing object in the second region of the electronic document in accordance with the modification to the set of content objects and in view of the mapping between the set of content objects and the drawing object.

2. The method of claim 1, wherein the modification to the set of content objects comprises the addition of the one or more additional content objects to the set of content objects in the first region of the electronic document, and wherein modifying the presentation of the drawing object in the second region of the electronic document comprises increasing a size of the drawing object in view of a size associated with the one or more additional content objects.

3. The method of claim 1, wherein the modification to the set of content objects comprises the removal of the one or more content objects from the set of content objects in the first region of the electronic document, and wherein modifying the presentation of the drawing object in the second region of the electronic document comprises decreasing a size of the drawing object in view of a size associated with the removed one or more text objects from the set of content objects.

4. The method of claim 1, wherein the modification to the set of content objects comprises the removal of the set of content objects from the first region of the electronic document, and wherein modifying the presentation of the drawing object in the second region of the electronic document comprises removing the drawing object from the second region of the electronic document.

5. The method of claim 1, wherein the first object characteristics comprise one or more first coordinates of the first region of the electronic document that includes the set of content objects and the second object characteristics comprise one or more second coordinates of the second region of the electronic document that includes the drawing object, and wherein determining that the drawing object corresponds to the set of content objects comprises determining that a proximity of the one or more second coordinates to the one or more first coordinates satisfies a proximity criterion.

6. The method of claim 1, further comprising:
providing the set of content objects as input to a first machine learning model, wherein the first machine learning model is trained to predict, for a given set of content objects, a content topic associated with the given set of content objects;
obtaining one or more outputs of the first machine learning model, wherein the one or more obtained outputs identify one or more content topics and, for each of the one or more content topics, an indication of a level of confidence that a respective content topic is associated with the set of content objects; and
determining the content topic associated with the set of content objects from the one or more identified content topics based on the indicated level of confidence of each respective content topic of the obtained outputs, wherein the determined content topic is included in the first object characteristics associated with the set of content objects.

7. The method of claim 6, further comprising:
providing the drawing object as input to a second machine learning model, wherein the second machine learning model is trained to predict, for a given drawing object, a drawing topic associated with the given drawing object;
obtaining one or more outputs of the second machine learning model, wherein the one or more obtained outputs identify or one or more drawing topics and, for each of the one or more drawing topics, an indication of a level of confidence that a respective drawing topic is associated with the drawing object; and
determining the drawing topic associated with the drawing object from the one or more identified drawing topics based on the indicated level of confidence of each respective drawing topic of the obtained one or more outputs, wherein the determined drawing topic is included in the second object characteristics associated with the drawing object.

8. The method of claim 7, wherein determining that the drawing object corresponds to the set of content objects comprises determining that the drawing topic associated with the drawing object corresponds to the content topic associated with the set of content objects.

9. The method of claim 1, wherein determining whether the drawing object corresponds to the set of content objects is responsive to detecting that an editing mode associated with the electronic document is modified from a first editing mode to a second editing mode.

10. The method of claim 1, wherein the modification to the set of content objects comprise the change in at least one of the size or the position of the one or more content objects of the set of content objects, and wherein modifying the presentation of the drawing object in the second region of the electronic document comprises changing the at least one of the size or the position of the one or more content objects in accordance with the at least one of the change or the position of the one or more content objects.

11. A system comprising:
a memory device; and
a processing device coupled to the memory device, the processing device to perform operations comprising:
providing an electronic document for presentation via a graphical user interface (GUI) associated with a collaborative document platform, wherein a first region of the electronic document comprises a set of content objects comprising at least one of a text object or an image object and a second region of the electronic document comprises a drawing object;
determining, based on first object characteristics associated with the set of content objects and second object characteristics associated with the drawing object, whether the drawing object corresponds to the set of content objects;
responsive to determining that the drawing object corresponds to the set of content objects, generating a mapping between the set of content objects and the drawing object;
identifying a modification to the set of content objects in the first region of the electronic document based on a user interaction with one or more GUI elements of the GUI that correspond to the set of content objects, wherein the modification to the set of content objects comprises at least one of:
an addition of at least one or more additional content objects to the set of one or more content objects,
a removal of one or more content objects from the set of content objects, or
a change in at least one of a size or a position of one or more content objects of the set of content objects; and
responsive to the modification to the set of content objects in the first region, modifying a presentation of the drawing object in the second region of the electronic document in accordance with the modification to the set of content objects and in view of the mapping between the set of content objects and the drawing object.

12. The system of claim 11, wherein the modification to the set of content objects comprises the addition of the one or more additional content objects to the set of content objects in the first region of the electronic document, and wherein modifying the presentation of the drawing object in the second region of the electronic document comprises increasing a size of the drawing object in view of a size associated with the one or more additional content objects.

13. The system of claim 11, wherein the modification to the set of content objects comprises the removal of the one or more content objects from the set of content objects in the first region of the electronic document, and wherein modifying the presentation of the drawing object in the second region of the electronic document comprises decreasing a size of the drawing object in view of a size associated with the removed one or more text objects from the set of content objects.

14. The system of claim 11, wherein the modification to the set of content objects comprises the removal of the set of content objects from the first region of the electronic document, and wherein modifying the presentation of the drawing object in the second region of the electronic document comprises removing the drawing object from the second region of the electronic document.

15. The system of claim 11, wherein the first object characteristics comprise one or more first coordinates of the first region of the electronic document that includes the set of content objects and the second object characteristics comprise one or more second coordinates of the second region of the electronic document that includes the drawing object, and wherein determining that the drawing object corresponds to the set of content objects comprises determining that a proximity of the one or more second coordinates to the one or more first coordinates satisfies a proximity criterion.

16. The system of claim 11, wherein the operations further comprise:
providing the set of content objects as input to a first machine learning model, wherein the first machine learning model is trained to predict, for a given set of content objects, a content topic associated with the given set of content objects;
obtaining one or more outputs of the first machine learning model, wherein the one or more obtained outputs identify one or more content topics and, for each of the one or more content topics, an indication of a level of confidence that a respective content topic is associated with the set of content objects; and
determining the content topic associated with the set of content objects from the one or more identified content topics based on the indicated level of confidence of each respective content topic of the obtained outputs, wherein the determined content topic is included in the first object characteristics associated with the set of content objects.

17. A non-transitory computer readable storage medium comprising instructions for a server that, when executed by a processing device, cause the processing device to perform operations comprising:
providing an electronic document for presentation via a graphical user interface (GUI) associated with a collaborative document platform, wherein a first region of the electronic document comprises a set of content objects comprising at least one of a text object or an image object and a second region of the electronic document comprises a drawing object;
determining, based on first object characteristics associated with the set of content objects and second object characteristics associated with the drawing object, whether the drawing object corresponds to the set of content objects;
responsive to determining that the drawing object corresponds to the set of content objects, generating a mapping between the set of content objects and the drawing object;
identifying a modification to the set of content objects in the first region of the electronic document based on a user interaction with one or more GUI elements of the GUI that correspond to the set of content objects, wherein the modification to the set of content objects comprises at least one of:
an addition of one or more additional content objects to the set of one or more content objects,
a removal of one or more content objects from the set of content objects, or
a change in at least one of a size or a position of one or more content objects of the set of content objects; and
responsive to the modification to the set of content objects in the first region, modifying a presentation of the drawing object in the second region of the electronic document in accordance with the modification to the set of content objects and in view of the mapping between the set of content objects and the drawing object.

18. The non-transitory computer readable storage medium of claim 17, wherein the modification to the set of content objects comprises the addition of the one or more additional content objects to the set of content objects in the first region of the electronic document, and wherein modifying the presentation of the drawing object in the second region of the electronic document comprises increasing a size of the drawing object in view of a size associated with the one or more additional content objects.

19. The non-transitory computer readable storage medium of claim 17, wherein the modification to the set of content objects comprises the removal of the one or more content objects from the set of content objects in the first region of the electronic document, and wherein modifying the presentation of the drawing object in the second region of the electronic document comprises decreasing a size of the drawing object in view of a size associated with the removed one or more text objects from the set of content objects.

20. The non-transitory computer readable storage medium of claim 17, wherein the modification to the set of content objects comprises the removal of the set of content objects from the first region of the electronic document, and wherein modifying the presentation of the drawing object in the second region of the electronic document comprises removing the drawing object from the second region of the electronic document.

* * * * *